United States Patent
Iida et al.

(10) Patent No.: US 10,025,221 B2
(45) Date of Patent: Jul. 17, 2018

(54) IMAGE FORMING APPARATUS HAVING PHOTOSENSITIVE MEMBER SCANNED BY LIGHT THAT CHANGES IN SCANNING SPEED IN ACCORDANCE WITH IMAGE HEIGHT

(71) Applicant: CANON KABUSHIKI KAISHA, Tokyo (JP)

(72) Inventors: Kenichi Iida, Tokyo (JP); Yusuke Shimizu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/497,060

(22) Filed: Apr. 25, 2017

(65) Prior Publication Data

US 2017/0343919 A1    Nov. 30, 2017

(30) Foreign Application Priority Data

May 27, 2016    (JP) .................................. 2016-106715

(51) Int. Cl.
  *G03G 15/043*    (2006.01)
  *H04N 1/405*    (2006.01)
  (Continued)

(52) U.S. Cl.
  CPC ..... *G03G 15/043* (2013.01); *G03G 15/04027* (2013.01); *G06K 15/1242* (2013.01);
  (Continued)

(58) Field of Classification Search
  CPC ........... G03G 15/043; G03G 15/04027; G03K 15/1242; H04N 1/405; H04N 1/4055;
  (Continued)

(56) References Cited

U.S. PATENT DOCUMENTS

| 4,532,552 A | 7/1985 | Uno ............................... 358/302 |
| 7,675,532 B2 | 3/2010 | Iida et al. ..................... 347/132 |

(Continued)

FOREIGN PATENT DOCUMENTS

| JP | S58-125064 | 7/1983 |
| JP | H02-131212 | 5/1990 |

(Continued)

OTHER PUBLICATIONS

U.S. Appl. No. 15/489,450, filed Apr. 17, 2017.

*Primary Examiner* — Christopher D Wait
(74) *Attorney, Agent, or Firm* — Fitzpatrick, Cella, Harper & Scinto

(57) ABSTRACT

An image forming apparatus includes: a correction unit configured to correct a tone of each pixel in first image data in accordance with an image height on a photosensitive member, and output second image data; a halftone processing unit configured to determine exposed regions of pixels in an image by applying halftone processing to the second image data; and a scanning unit configured to form a latent image by scanning the photosensitive member with light that changes in scanning speed in accordance with an image height based on the exposed regions of the pixels. The scanning unit is further configured to perform partial exposure with respect to the pixels based on the exposed regions of the pixels, the partial exposure exposing partial regions of the pixels to light unlike entire exposure that exposes entire regions of the pixels to light.

24 Claims, 28 Drawing Sheets

(51) Int. Cl.
*H04N 1/407* (2006.01)
*G03G 15/04* (2006.01)
*G06K 15/12* (2006.01)
*H04N 1/40* (2006.01)
*G06K 15/02* (2006.01)

(52) U.S. Cl.
CPC ............ *H04N 1/405* (2013.01); *H04N 1/407* (2013.01); *H04N 1/4055* (2013.01); *G06K 15/1825* (2013.01); *G06K 15/1876* (2013.01); *G06K 15/1881* (2013.01); *H04N 1/40* (2013.01)

(58) Field of Classification Search
CPC ...... H04N 1/407; H04N 1/40; G06K 15/1825; G06K 15/1876; G06K 15/1881
See application file for complete search history.

(56) References Cited

U.S. PATENT DOCUMENTS

| | | | |
|---|---|---|---|
| 8,891,092 B2 | 11/2014 | Nakamura | ............... B41J 2/471 |
| 9,104,132 B2 | 8/2015 | Iida et al. | ............ G03G 15/043 |
| 9,319,553 B2 | 4/2016 | Kawana et al. | ... H04N 1/02885 |
| 9,575,314 B2 | 2/2017 | Araki | ................... G02B 26/124 |
| 2016/0246208 A1 | 8/2016 | Nagasaki et al. | .... G03G 15/043 |
| 2016/0246209 A1 | 8/2016 | Watanabe et al. | ... G03G 15/043 |
| 2016/0370727 A1 | 12/2016 | Nakajima et al. | ... G03G 15/043 |

FOREIGN PATENT DOCUMENTS

| | | |
|---|---|---|
| JP | H10-173930 | 6/1998 |
| JP | 2003-305883 | 10/2003 |
| JP | 2005-193589 | 7/2005 |
| JP | 2012-121242 | 6/2012 |
| JP | 2015-087622 | 5/2015 |
| JP | 2016-000510 | 1/2016 |

FIG. 5A

| a | b | c |
|---|---|---|
| d | e | f |
| g | h | i |

FIG. 5B

| R | C | L |
|---|---|---|
| R | C | L |
| R | C | L |

FIG. 6A

| a | | b | | c | |
|---|---|---|---|---|---|
| LEVEL | THRESHOLD | LEVEL | THRESHOLD | LEVEL | THRESHOLD |
| 1 | 144 | 1 | 30 | 1 | 153 |
| 2 | 147 | 2 | 31 | 2 | 155 |
| 3 | 150 | 3 | 32 | 3 | 157 |
| 4 | 153 | 4 | 33 | 4 | 159 |
| 5 | 156 | 5 | 35 | 5 | 161 |
| 6 | 159 | 6 | 37 | 6 | 163 |
| 7 | 162 | 7 | 39 | 7 | 165 |
| 8 | 165 | 8 | 41 | 8 | 167 |
| 9 | 168 | 9 | 43 | 9 | 169 |
| 10 | 171 | 10 | 45 | 10 | 171 |
| 11 | 172 | 11 | 47 | 11 | 229 |
| 12 | 173 | 12 | 49 | 12 | 230 |
| 13 | 174 | 13 | 51 | 13 | 231 |
| 14 | 175 | 14 | 53 | 14 | 233 |
| 15 | 177 | 15 | 55 | 15 | 235 |
| 16 | 179 | 16 | 57 | 16 | 236 |
| 17 | 181 | 17 | 57 | 17 | 237 |
| 18 | 181 | 18 | 153 | 18 | 237 |
| 19 | 181 | 19 | 154 | 19 | 237 |
| 20 | 181 | 20 | 155 | 20 | 237 |
| 21 | 181 | 21 | 156 | 21 | 237 |
| 22 | 181 | 22 | 157 | 22 | 237 |
| 23 | 181 | 23 | 159 | 23 | 237 |
| 24 | 181 | 24 | 162 | 24 | 237 |
| 25 | 181 | 25 | 247 | 25 | 237 |
| 26 | 181 | 26 | 248 | 26 | 237 |
| 27 | 181 | 27 | 249 | 27 | 237 |
| 28 | 181 | 28 | 250 | 28 | 237 |
| 29 | 181 | 29 | 251 | 29 | 237 |
| 30 | 181 | 30 | 253 | 30 | 237 |
| 31 | 181 | 31 | 255 | 31 | 237 |

FIG. 6B

| d | | e | | f | |
|---|---|---|---|---|---|
| LEVEL | THRESHOLD | LEVEL | THRESHOLD | LEVEL | THRESHOLD |
| 1 | 87 | 1 | 1 | 1 | 96 |
| 2 | 90 | 2 | 2 | 2 | 99 |
| 3 | 93 | 3 | 3 | 3 | 102 |
| 4 | 96 | 4 | 4 | 4 | 105 |
| 5 | 99 | 5 | 6 | 5 | 108 |
| 6 | 102 | 6 | 8 | 6 | 111 |
| 7 | 105 | 7 | 10 | 7 | 114 |
| 8 | 108 | 8 | 12 | 8 | 117 |
| 9 | 111 | 9 | 14 | 9 | 120 |
| 10 | 114 | 10 | 16 | 10 | 123 |
| 11 | 117 | 11 | 18 | 11 | 126 |
| 12 | 120 | 12 | 20 | 12 | 129 |
| 13 | 123 | 13 | 22 | 13 | 132 |
| 14 | 126 | 14 | 24 | 14 | 135 |
| 15 | 129 | 15 | 26 | 15 | 138 |
| 16 | 132 | 16 | 28 | 16 | 141 |
| 17 | 133 | 17 | 29 | 17 | 143 |
| 18 | 163 | 18 | 144 | 18 | 163 |
| 19 | 164 | 19 | 145 | 19 | 164 |
| 20 | 165 | 20 | 146 | 20 | 165 |
| 21 | 166 | 21 | 147 | 21 | 166 |
| 22 | 167 | 22 | 148 | 22 | 167 |
| 23 | 169 | 23 | 150 | 23 | 169 |
| 24 | 171 | 24 | 152 | 24 | 171 |
| 25 | 210 | 25 | 182 | 25 | 191 |
| 26 | 211 | 26 | 183 | 26 | 192 |
| 27 | 212 | 27 | 184 | 27 | 193 |
| 28 | 214 | 28 | 185 | 28 | 194 |
| 29 | 216 | 29 | 186 | 29 | 196 |
| 30 | 217 | 30 | 188 | 30 | 198 |
| 31 | 218 | 31 | 190 | 31 | 200 |

FIG. 6C

| g | | h | | i | |
|---|---|---|---|---|---|
| LEVEL | THRESHOLD | LEVEL | THRESHOLD | LEVEL | THRESHOLD |
| 1 | 153 | 1 | 58 | 1 | 144 |
| 2 | 155 | 2 | 59 | 2 | 147 |
| 3 | 157 | 3 | 60 | 3 | 150 |
| 4 | 159 | 4 | 62 | 4 | 153 |
| 5 | 161 | 5 | 64 | 5 | 156 |
| 6 | 163 | 6 | 66 | 6 | 159 |
| 7 | 165 | 7 | 68 | 7 | 162 |
| 8 | 167 | 8 | 70 | 8 | 165 |
| 9 | 169 | 9 | 72 | 9 | 168 |
| 10 | 171 | 10 | 74 | 10 | 171 |
| 11 | 238 | 11 | 76 | 11 | 201 |
| 12 | 239 | 12 | 78 | 12 | 202 |
| 13 | 240 | 13 | 80 | 13 | 203 |
| 14 | 241 | 14 | 82 | 14 | 204 |
| 15 | 243 | 15 | 84 | 15 | 206 |
| 16 | 245 | 16 | 85 | 16 | 208 |
| 17 | 246 | 17 | 86 | 17 | 209 |
| 18 | 246 | 18 | 163 | 18 | 209 |
| 19 | 246 | 19 | 164 | 19 | 209 |
| 20 | 246 | 20 | 165 | 20 | 209 |
| 21 | 246 | 21 | 166 | 21 | 209 |
| 22 | 246 | 22 | 167 | 22 | 209 |
| 23 | 246 | 23 | 168 | 23 | 209 |
| 24 | 246 | 24 | 171 | 24 | 209 |
| 25 | 246 | 25 | 219 | 25 | 209 |
| 26 | 246 | 26 | 220 | 26 | 209 |
| 27 | 246 | 27 | 221 | 27 | 209 |
| 28 | 246 | 28 | 223 | 28 | 209 |
| 29 | 246 | 29 | 225 | 29 | 209 |
| 30 | 246 | 30 | 227 | 30 | 209 |
| 31 | 246 | 31 | 228 | 31 | 209 |

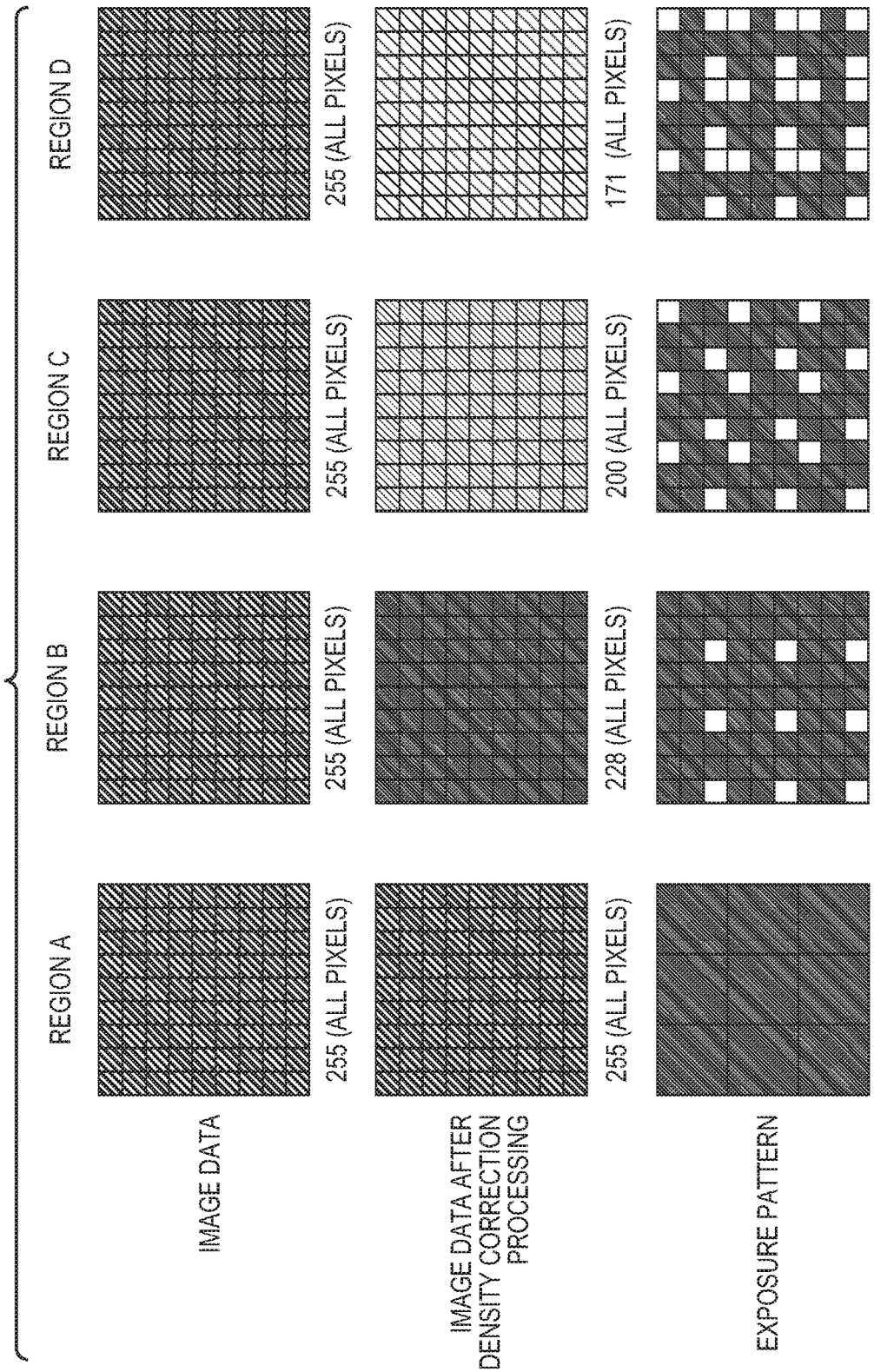

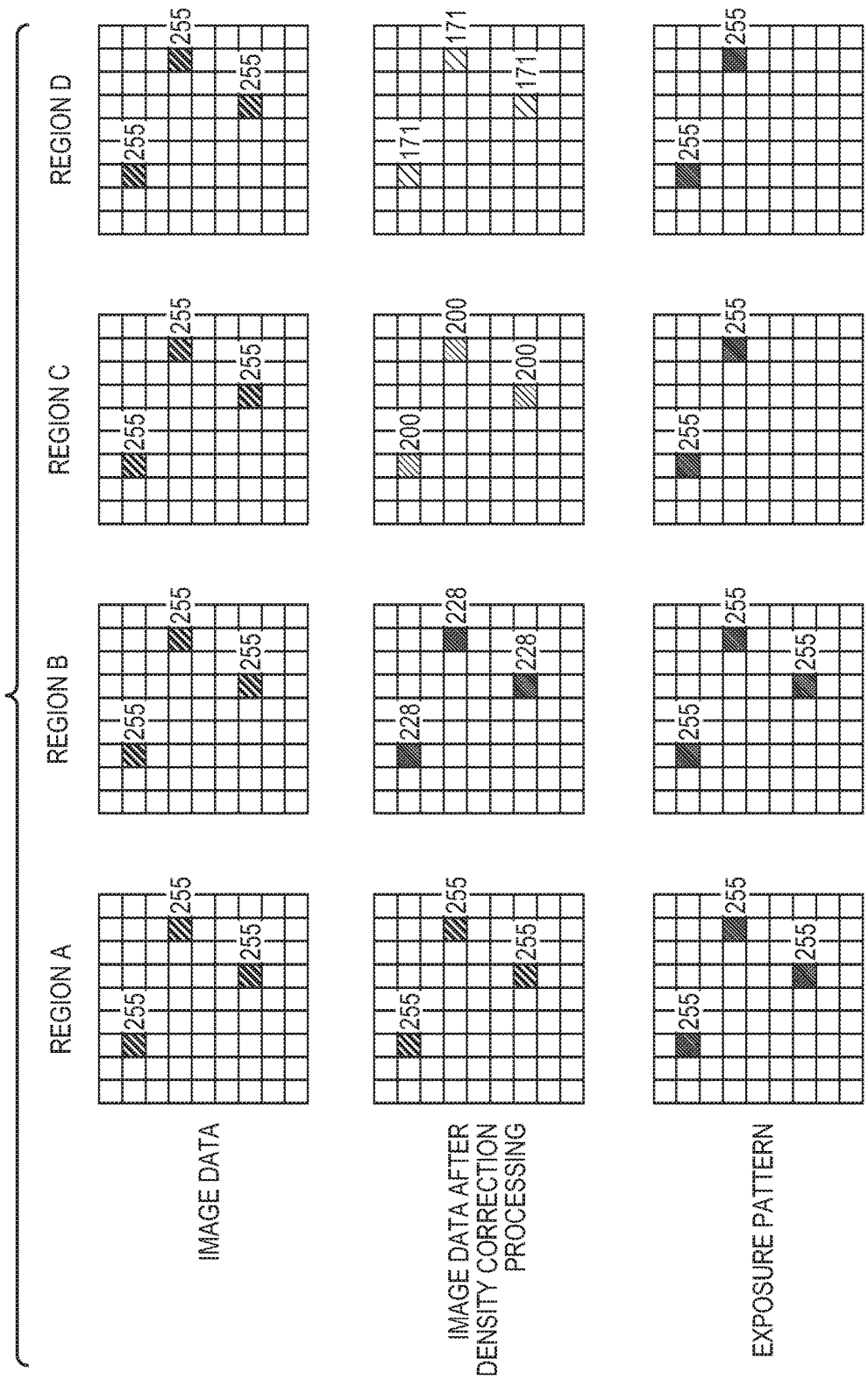

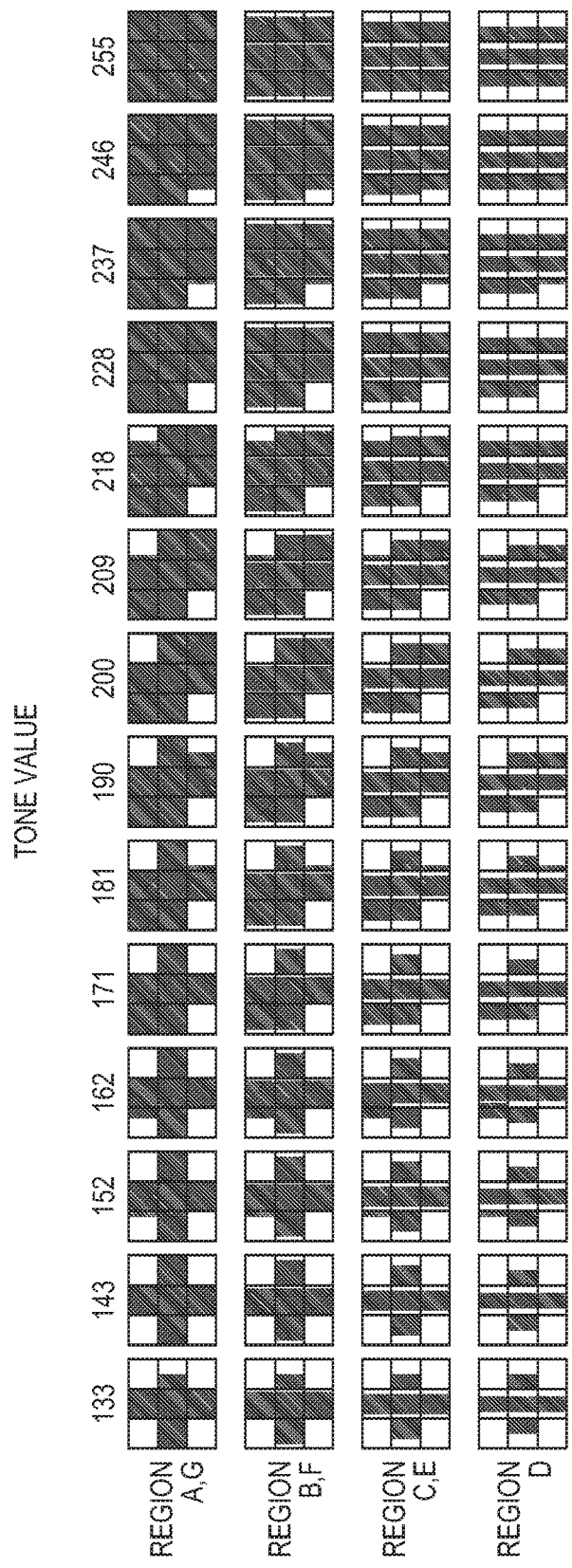

IMAGE FORMING APPARATUS HAVING PHOTOSENSITIVE MEMBER SCANNED BY LIGHT THAT CHANGES IN SCANNING SPEED IN ACCORDANCE WITH IMAGE HEIGHT

BACKGROUND OF THE INVENTION

Field of the Invention

The present invention relates to an image forming apparatus of an electrophotographic method, such as a laser beam printer, a digital copier, and a digital facsimile machine.

Description of the Related Art

An image forming apparatus of an electrophotographic method includes an optical scanning apparatus for exposing a photosensitive member to light. The optical scanning apparatus scans the photosensitive member, or exposes the photosensitive member to light, by emitting an optical beam based on image data and causing the emitted optical beam to be reflected by a rotating polygonal mirror and transmitted through a scanning lens having the fθ characteristics. The fθ characteristics are optical characteristics that cause a spot formed by the optical beam to move at a constant speed on a surface of the photosensitive member while the rotating polygonal mirror is rotating at a constant angular velocity. However, a scanning lens having the fθ characteristics is large in size, and contributes to an increase in the size of an image forming apparatus. This has given rise to the idea of using no scanning lens, or using a scanning lens that does not have the fθ characteristics. Japanese Patent Laid-Open No. S58-125064 discloses a configuration that changes a clock frequency so that pixels formed on a photosensitive member have a constant pixel width even when a spot formed by an optical beam does not move at a constant speed on a surface of the photosensitive member.

However, even if a constant pixel width is achieved by changing the clock frequency, an exposure amount per unit area on the photosensitive member varies due to fluctuations in the scanning speed. Such variations in the exposure amount can be the cause of defective images.

SUMMARY OF THE INVENTION

According to an aspect of the present invention, an image forming apparatus, includes: a photosensitive member; a correction unit configured to correct a tone of each pixel in first image data in accordance with an image height on the photosensitive member, and output resultant second image data; a halftone processing unit configured to determine exposed regions of pixels in an image to be formed by applying halftone processing to the second image data using a multi-pixel dither matrix; and a scanning unit configured to form a latent image by scanning the photosensitive member with light that changes in scanning speed in accordance with an image height based on the exposed regions of the pixels determined by the halftone processing unit. The scanning unit is further configured to perform partial exposure with respect to the pixels based on the exposed regions of the pixels, the partial exposure exposing partial regions of the pixels to light unlike entire exposure that exposes entire regions of the pixels to light.

Further features of the present invention will become apparent from the following description of exemplary embodiments with reference to the attached drawings.

BRIEF DESCRIPTION OF THE DRAWINGS

FIG. 5A shows a dither matrix according to an embodiment.

FIG. 5B shows a position control matrix according to an embodiment.

FIGS. 6A to 6C are diagrams for describing halftone processing according to an embodiment.

FIG. 13 shows exposure patterns for a solid image according to an embodiment.

FIG. 14 shows exposure patterns for an image having isolated pixels according to an embodiment.

FIGS. 21A and 21B show relationships between tone values and exposed portions according to an embodiment.

DESCRIPTION OF THE EMBODIMENTS

The following describes exemplary embodiments of the present invention with reference to the drawings. Note that the following embodiments are examples, and the present invention is not limited to the contents of the embodiments. In each of the drawings described below, constituents that are not necessary for the description of the embodiments will be omitted.

First Embodiment

Figure 1:
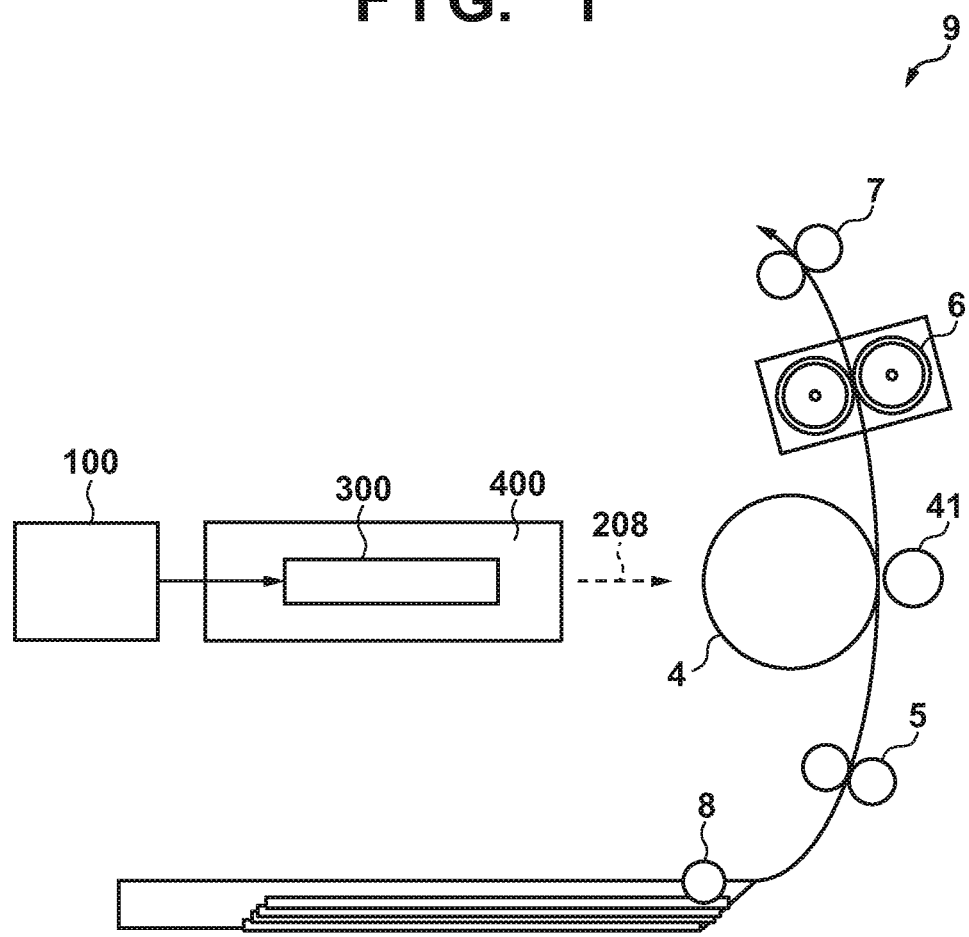
FIG. 1 shows a configuration of an image forming apparatus according to an embodiment.

FIG. 1 shows a schematic configuration of an image forming apparatus 9 according to the present embodiment. A laser driving unit 300 of an optical scanning apparatus 400 emits an optical beam 208 based on image data output from an image signal generation unit 100. A photosensitive member 4 charged by a non-illustrated charging unit is scanned by, or exposed to, the optical beam 208; as a result, a latent image is formed on a surface of the photosensitive member 4. A non-illustrated developer forms a toner image by developing the latent image using toner. A roller 5 conveys a recording medium fed from a feeding unit 8 to a nip region between the photosensitive member 4 and a transfer roller 41. The transfer roller 41 transfers the toner image formed on the photosensitive member 4 onto the conveyed recording medium. Thereafter, the recording medium is conveyed to a fixing unit 6. The fixing unit 6 fixes the toner image onto the recording medium by applying heat and pressure to the recording medium. Once the toner image has been fixed onto the recording medium, a discharge roller 7 discharges the recording medium to the outside of the image forming apparatus 9.

Figure 2A:
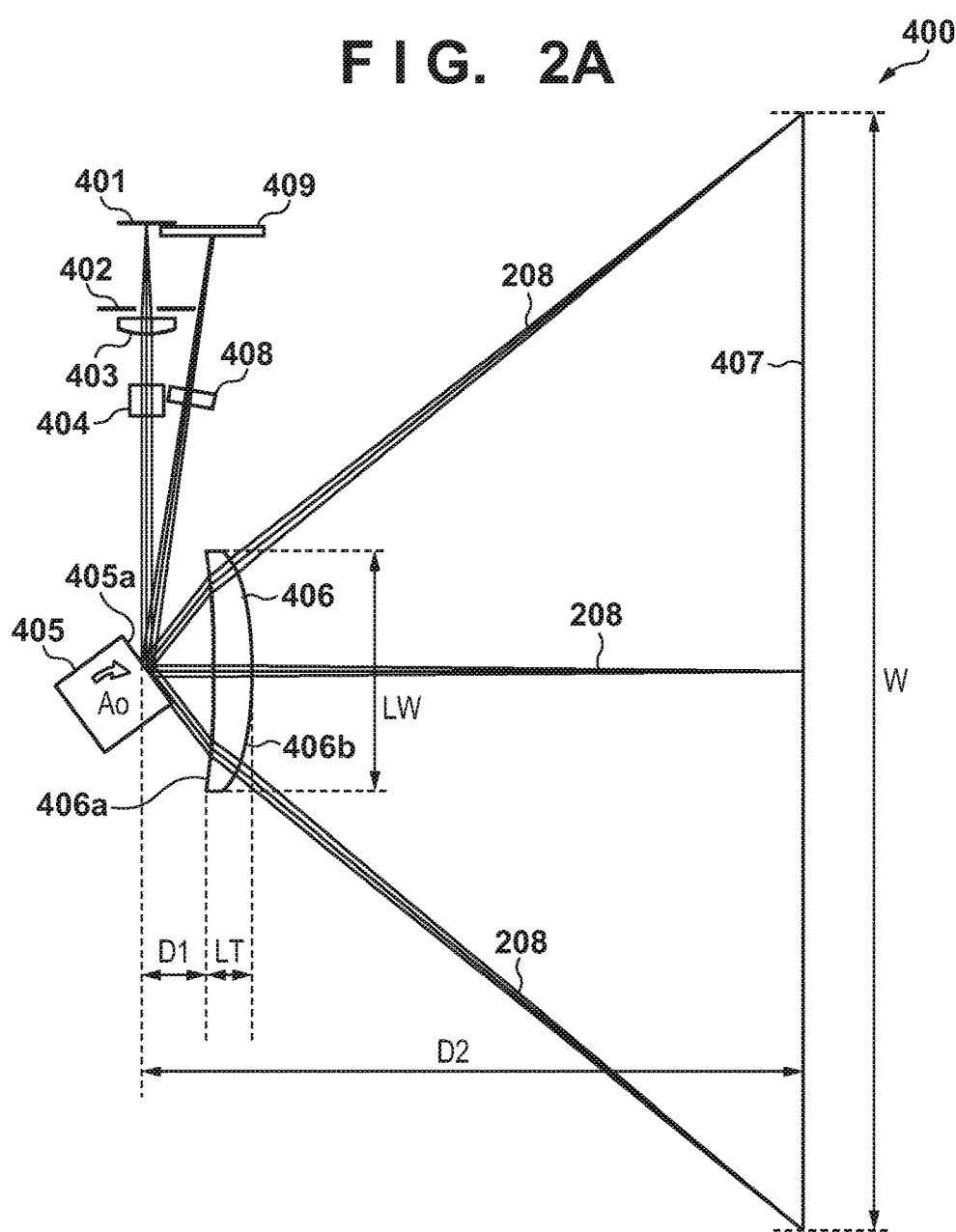
FIGS. 2A and 2B show a configuration of an optical scanning apparatus according to an embodiment.
Figure 2B:
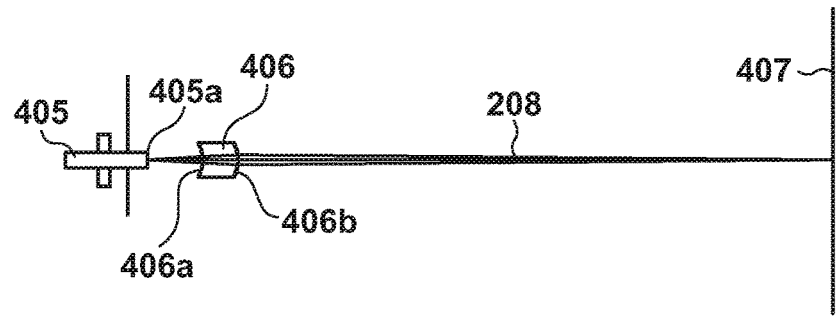

FIGS. 2A and 2B show a configuration of the optical scanning apparatus 400 according to the present embodiment; specifically, FIG. 2A is a cross-sectional view taken along a main scanning direction, and FIG. 2B is a cross-sectional view taken along a sub scanning direction. An optical beam (light beam) 208 emitted by a light source 401 is formed into an elliptical shape by an aperture diaphragm 402, and then made incident on a coupling lens 403. The optical beam 208 is converted into substantially collimated light by passing through the coupling lens 403, and then made incident on an anamorphic lens 404. Note that the substantially collimated light includes weak convergent light and weak divergent light. In a cross-section taken along the main scanning direction, the anamorphic lens 404 has a positive refractive power and converts the incident light beam into convergent light. On the other hand, in a cross-section taken along the sub scanning direction, the anamorphic lens 404 condenses the light beam toward the vicinity of a reflection surface 405a of a deflector 405 and forms a long line image in the main scanning direction.

The light beam that has passed through the anamorphic lens 404 is reflected by the reflection surface 405a of the deflector (polygon mirror) 405. The optical beam 208 that has been reflected by the reflection surface 405a is transmitted through an image forming lens 406 and forms an image, specifically, a predetermined spot image (hereinafter, a spot) on a surface of the photosensitive member 4. A non-illustrated driving unit rotates the deflector 405 in a direction of arrow Ao at a constant angular velocity; as a result, the spot moves in the main scanning direction on a scanned surface 407 of the photosensitive member 4, thereby forming an electrostatic latent image on the scanned surface 407. Note that the main scanning direction is parallel to the surface of the photosensitive member 4, and perpendicular to a moving direction of the surface of the photosensitive member 4. The sub scanning direction is the moving direction of the surface of the photosensitive member 4.

A beam detect (hereinafter, BD) sensor 409 and a BD lens 408 are optical systems for synchronization that determine the timing of writing an electrostatic latent image on the scanned surface 407. The optical beam 208 that has passed through the BD lens 408 is made incident on and detected by the BD sensor 409, which includes a photodiode. The timing of writing is controlled based on the timing of detection of the optical beam 208 by the BD sensor 409. Although the light source 401 according to the present embodiment includes one light emitter, the light source 401 may include a plurality of light emitters that can individually control light emission.

As shown in FIGS. 2A and 2B, the image forming lens 406 has two optical surfaces (lens surfaces): an incident surface 406a and an exit surface 406b. The image forming lens 406 is configured to cause the light beam deflected by the reflection surface 405a to scan the scanned surface 407 with desired scanning characteristics in a cross-section taken along the main scanning direction. The image forming lens 406 is also configured to make a spot formed on the scanned surface 407 by the laser light 208 into a desired shape.

The image forming lens 406 does not have the so-called fθ characteristics. That is, the spot does not move at a constant speed on the scanned surface 407 while the deflector 405 is rotating at a constant angular velocity. As the image forming lens 406 does not have the fθ characteristics, the image forming lens 406 can be located in proximity to (at a short distance D1 from) the deflector 405. Furthermore, the image forming lens 406 without the fθ characteristics has a smaller length (width LW) in the main scanning direction and a smaller length (thickness LT) in an optical axis direction than an image forming lens having the fθ characteristics. Therefore, the optical scanning apparatus 400 can be reduced in size. Moreover, a lens having the fθ characteristics may have an incident surface and an exit surface that change steeply in shape in a cross-section taken along the main scanning direction; favorable image forming performance may not be achieved with use of such a lens with a shape-related restriction. In contrast, as the image forming lens 406 does not have the fθ characteristics, there is hardly any steep change in the shapes of its incident surface and exit surface in the cross-section taken along the main scanning direction, and hence favorable image forming performance can be achieved. Note that the image forming lens 406 may be divided in the main scanning direction into a section(s) that has the fθ characteristics and a section(s) that does not have the fθ characteristics.

Figure 3:
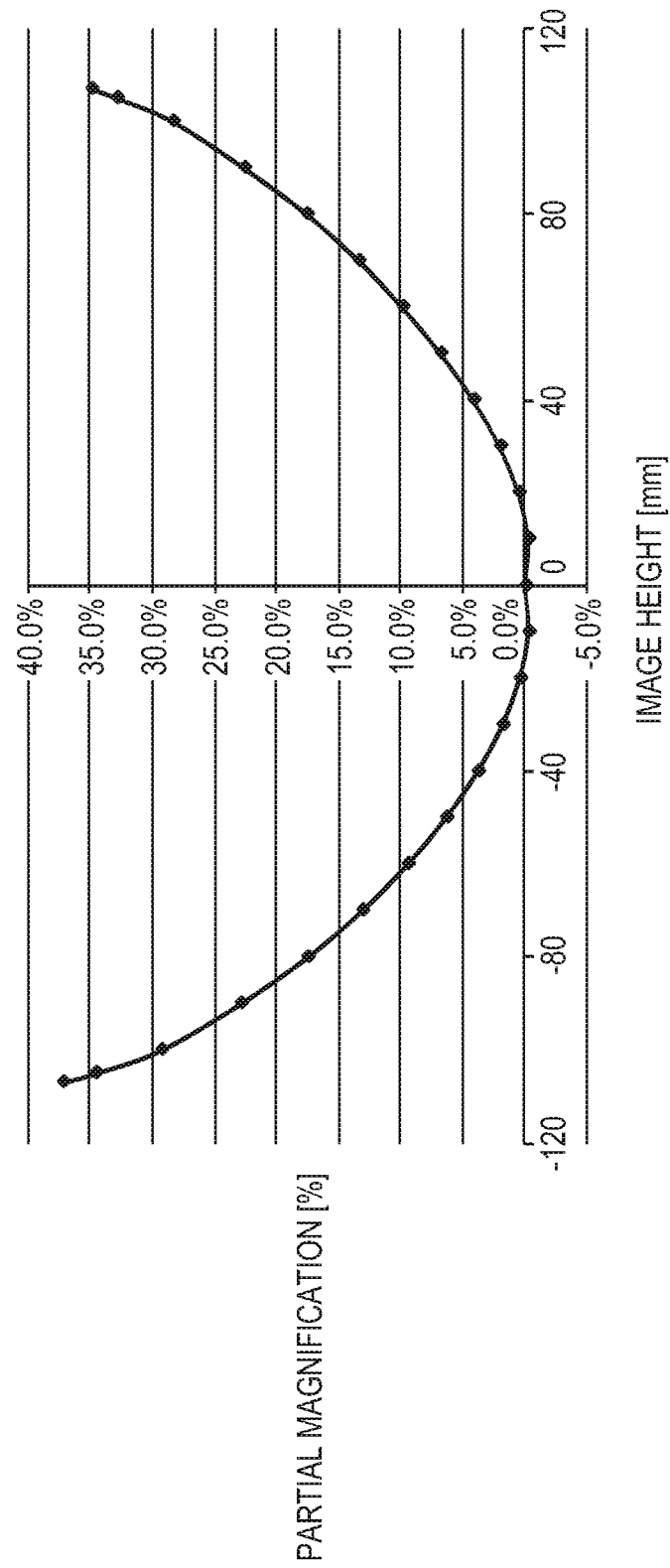
FIG. 3 shows a relationship between image heights and partial magnification according to an embodiment.

FIG. 3 shows a relationship between image heights and partial magnification according to the present embodiment. An image height of 0 refers to a spot on an optical axis of the image forming lens 406, and will hereinafter be referred to as an on-axis image height. Image heights other than the on-axis image height will hereinafter be referred to as out-of-axis image heights. The largest value among absolute values of image heights will hereinafter be referred to as a maximum out-of-axis image height. As shown in FIG. 2A, a position of the maximum out-of-axis image height on the scanned surface 407 is W/2. Referring to FIG. 3, taking for example an image height corresponding to a partial magnification of 30%, the scanning speed for this image height is 1.3 times faster than the scanning speed for an image height corresponding to a partial magnification of 0%. In the example of FIG. 3, the scanning speed for the on-axis image height is the lowest, and the scanning speed increases as the absolute value of the image height increases. Therefore, if a pixel width in the main scanning direction is determined based on a constant time interval determined by a clock cycle, the pixel density varies between the on-axis image height and the out-of-axis image heights. In view of this, in the present embodiment, the partial magnification is corrected. Specifically, the clock frequency is adjusted in accordance with an image height so that a substantially constant pixel width is achieved regardless of image height.

A period taken to scan across a unit length is shorter when an image height on the scanned surface 407 is approximately the maximum out-of-axis image height than when it is approximately the on-axis image height. In other words, provided that the luminance of light emitted by the light source 401 is constant, a total exposure amount per unit length is smaller when an image height is approximately the maximum out-of-axis image height than when it is approximately the on-axis image height. In view of this, the present embodiment corrects density in addition to the aforementioned partial magnification to achieve favorable image quality.

Figure 4:
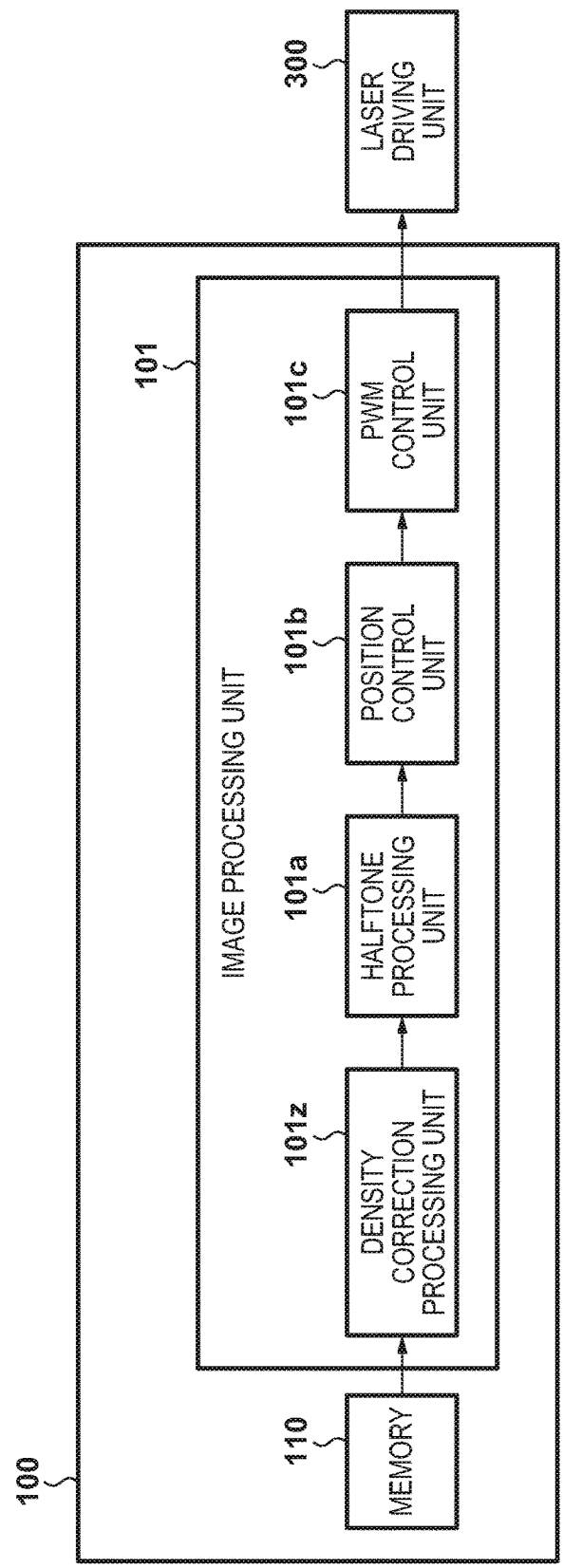
FIG. 4 shows a configuration of an image signal generation unit according to an embodiment.

FIG. 4 shows a configuration of the image signal generation unit 100. Image data from a non-illustrated host computer is stored to a memory 110. In the present example, it will be assumed that image data indicates the tone of each pixel using eight bits. A density correction processing unit 101z of an image processing unit 101 applies density correction processing to image data in the memory 110. The density correction processing will be described later in detail. A halftone processing unit 101a applies halftone processing to the image data after the density correction, and outputs the resultant image data that indicates the tone of each pixel using five bits.

Figures 5A, 5B:
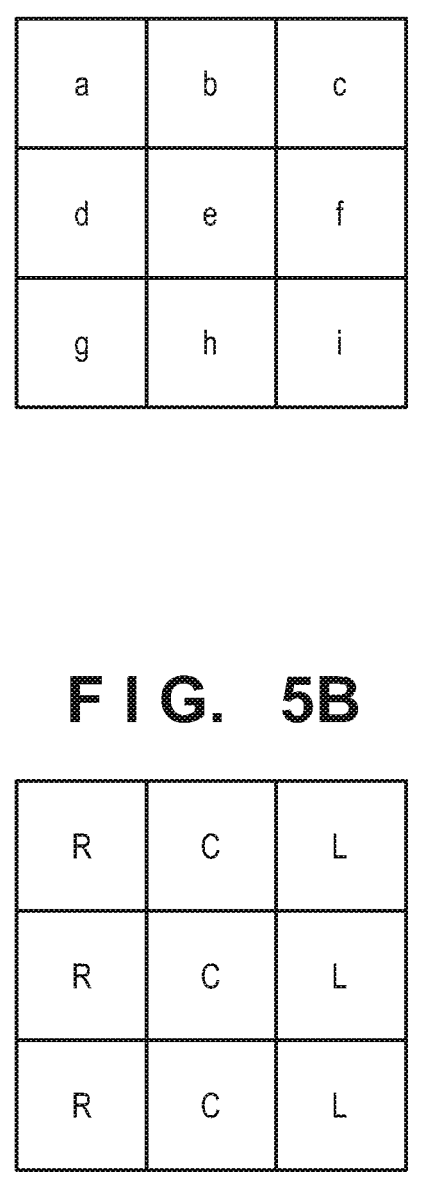

A description is now given of a sequence of processing executed by the halftone processing unit 101a. As shown in FIG. 5A, the present embodiment uses a dither matrix composed of a total of nine pixels a to i, that is, three pixels in the main scanning direction (a left-right direction in the figure) and three pixels in the sub scanning direction (an up-down direction in the figure). FIGS. 6A to 6C show levels and thresholds in correspondence with pixels a to i shown in FIG. 5A. letters "a" to "i" in FIGS. 6A to 6C correspond to pixels a to i shown in FIG. 5A. The halftone processing unit 101a determines one of pixels a to i shown in FIG. 5A that corresponds to input image data, cross-references a tone value of the input image data with thresholds of the corresponding pixel in the table shown in FIGS. 6A to 6C, and outputs a corresponding level. It will be assumed that a threshold in a level in the table shown in FIGS. 6A to 6C denotes a range of values that are equal to or larger than the threshold in the level and smaller than a threshold of a next upper level. Therefore, for example, in the case of pixel a, when the input tone value is 151, the halftone processing unit 101a outputs level 3. When a plurality of levels correspond to the same threshold range, the halftone processing unit 101a outputs the highest level. Therefore, in the case of pixel a, when the input tone value is 181 or above, the halftone processing unit 101a outputs level 31.

Referring back to FIG. 4, a position control unit 101b adds 2-bit position control data indicating a growth direction to the 5-bit image data after multi-level dithering processing, and outputs the resultant image data to a PWM control unit 101c. Processing executed by the position control unit 101b will now be described in detail. FIG. 5B shows a position control matrix according to the present example. Squares in the position control matrix shown in FIG. 5B each represent one pixel, and correspond to the pixels in the dither matrix shown in FIG. 5A. In FIG. 5B, "R" is set for pixels a, d, and g, "C" is set for pixels b, e, and h, and "L" is set for pixels c, f, and i. Note that "R," "C," and "L" are encoded using two bits. For example, "R"="01," "C"="00," and "L"="10."

The position control data indicates a dot growth direction in a pixel. Specifically, "R" indicates that dots grow from the right edge toward the left side of a pixel. On the other hand, "C" indicates that dots grow from the center of a pixel in both leftward and rightward directions. Furthermore, "L" indicates that dots grow from the left edge toward the right side of a pixel. The position control unit 101b adds the 2-bit position control data to each pixel of the image data after the dithering processing, and outputs the resultant image data to the PWM control unit 101c.

Figure 7:
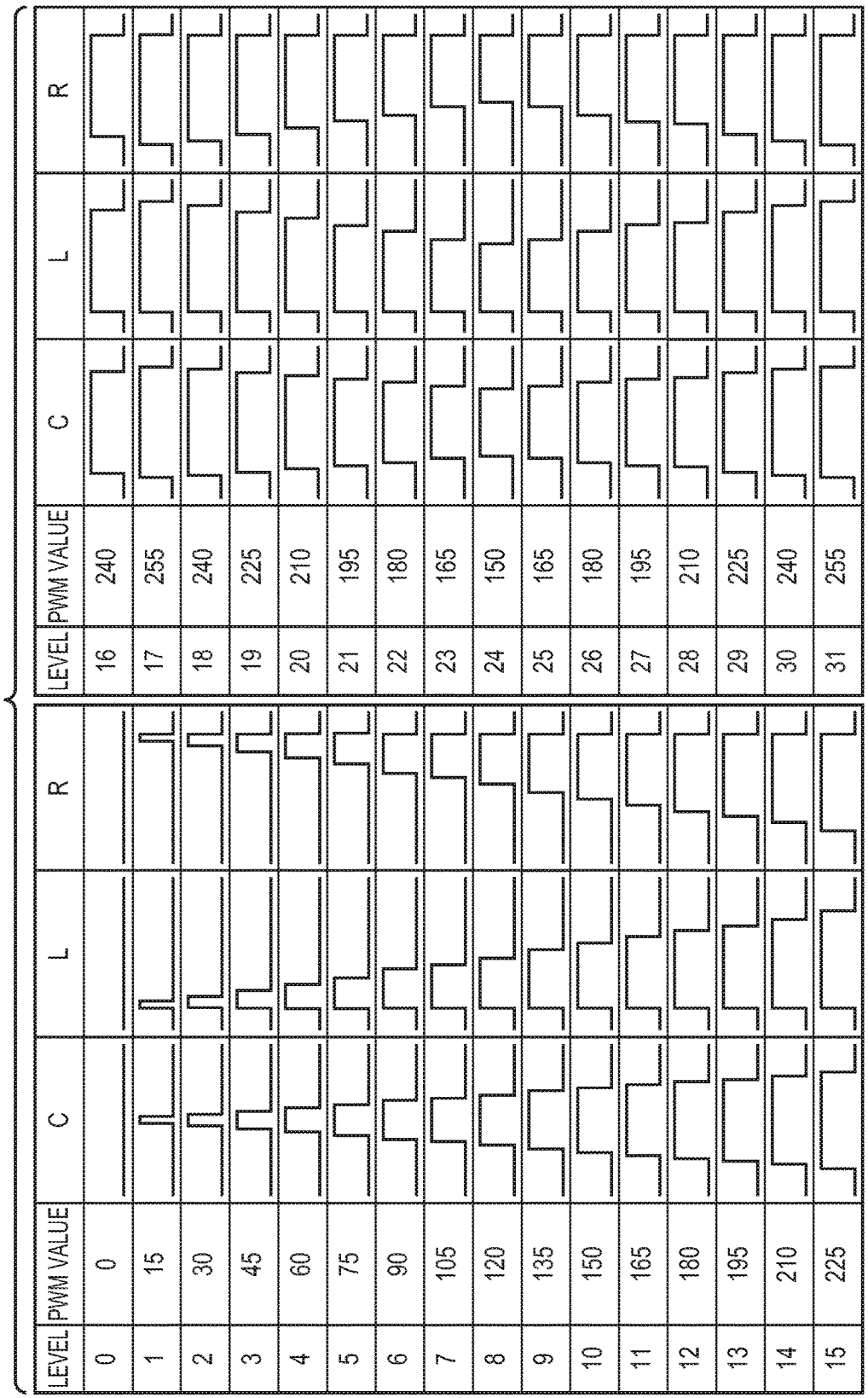
FIG. 7 is a diagram for describing how a PWM signal is generated according to an embodiment.

The PWM control unit 101c generates a PWM signal based on the 7-bit image data to which the position control data has been added, and outputs the PWM signal to the laser driving unit 300. FIG. 7 is a diagram for describing how the PWM control unit 101c generates a PWM signal. With regard to one pixel, the PWM control unit 101c extracts five bits indicating the level and two bits representing the position control data. Then, based on the position control data and the level, a PWM signal is generated in accordance with FIG. 7. In the present embodiment, as shown in FIG. 7, between level 0 and level 17, a pulse width (corresponding to an exposure period) of a PWM signal increases as the level increases. As stated earlier, when the position control data indicates "C," an exposed region increases gradually from the center of a pixel. Similarly, when the position control data indicates "L," an exposed region increases gradually from the left edge of a pixel; when the position control data indicates "R," an exposed region increases gradually from the right edge of a pixel. Note that a PWM value indicates a pulse width of a PWM signal, and a PWM value of 255 means that the entire pixel is exposed to light. As shown in FIG. 7, above level 17, specifically, between level 18 and level 24, a pulse width of a PWM signal decreases as the level increases. Above level 24, a pulse width of a PWM signal increases again. As described above, in the present embodiment, the halftone processing unit 101a, position control unit 101b, and PWM control unit 101c determine an exposed region for each pixel by applying the halftone processing to image data after the density correction processing.

Figure 8:
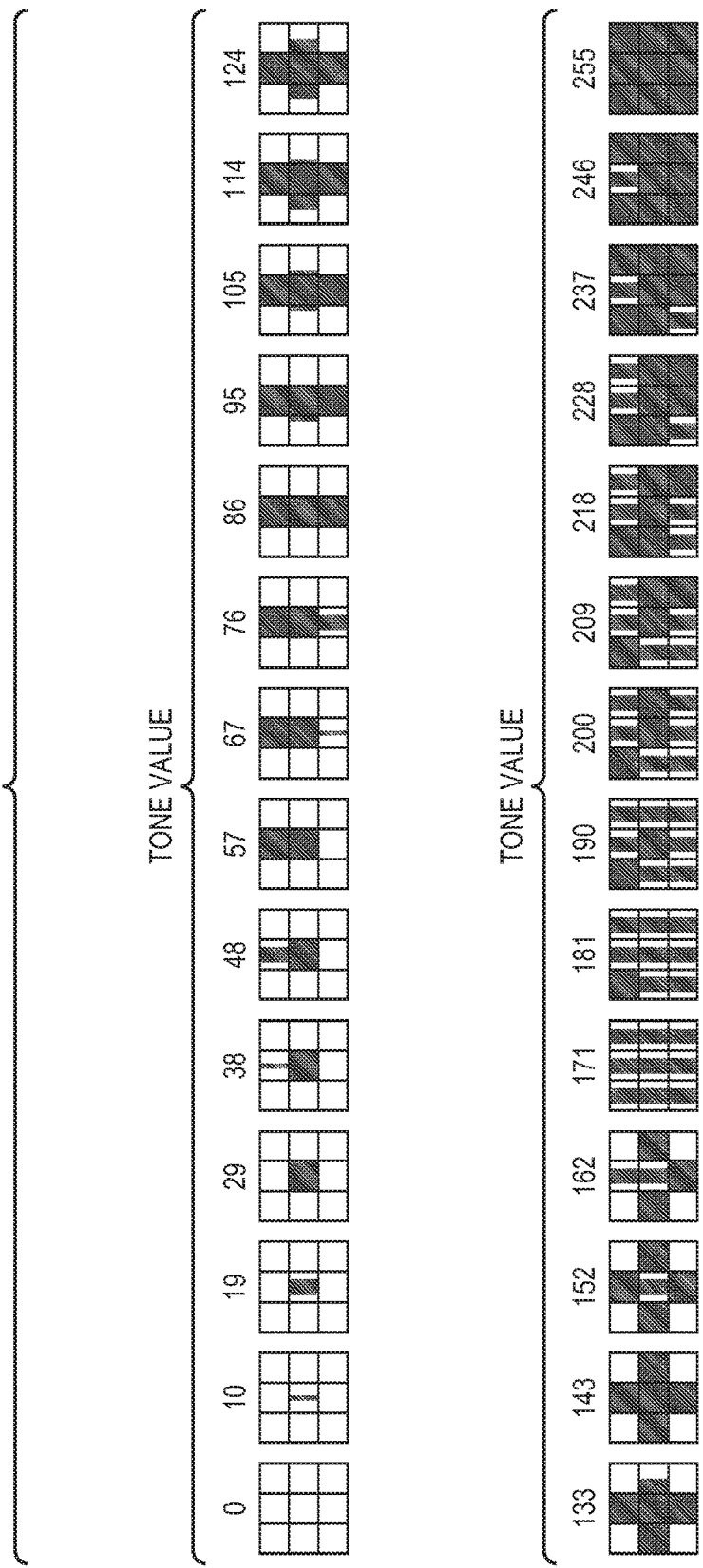
FIG. 8 shows a relationship between tone values and exposed portions according to an embodiment.

FIG. 8 shows a relationship between tone values and exposed portions for a case in which the nine pixels in the dither matrix all have the same tone value. In the figure, shaded portions represent the exposed portions. In the dither matrix, when the tone value is between 0 and 29, an exposed area increases only in pixel e as the tone value increases. Then, an exposed area increases in pixel b as the tone value increases to 57. Then, an exposed area increases in pixel h as the tone value increases to 86. Then, an exposed area increases in pixels d and f as the tone value increases to 143. Note that when the tone value is 143, the entire regions of pixels b, d, e, f, and h are exposed to light. Meanwhile, when the tone value is 143 or below, pixels a, c, g, and i remain unexposed to light.

When the tone value exceeds 143, an exposed area increases in pixels a, c, g, and i and decreases in pixels b, d, e, f, and h as the tone value increases to 171. As a whole, an exposed area increases, and thus the density increases. When the tone value is 171, an area corresponding to a PWM value of 150 is exposed to light in every pixel. Then, an exposed area increases in each pixel as the tone value increases to 255, and when the tone value is 255, the entire region of every pixel is exposed to light.

For example, pixels b, d, e, f, and h are classified as pixels in a first region, and pixels a, c, g, and i are classified as pixels in a second region. Furthermore, a tone value of 143 and a tone value of 171 are used as a first threshold and a second threshold, respectively. In this case, in the halftone processing according to the present embodiment shown in FIG. 8, exposed areas of the first and second regions satisfy the following relationships. It will be assumed that all pixels in the dither matrix have the same tone value. First, when the tone value is equal to or smaller than the first threshold, an exposed area increases in the first region as the tone value increases. At this time, as shown in FIG. 8, the first region has a continuous exposed region. Furthermore, when the tone value is equal to or smaller than the first threshold, the second region is unexposed to light. On the other hand, when the tone value is equal to or larger than the first threshold and equal to or smaller than the second threshold, an exposed area decreases in the first region and increases in the second region as the tone value increases. Therefore, in the first region, an exposed area is smaller when the tone value is larger than the first threshold and equal to or smaller than the second threshold than when the tone value is equal to the first threshold. Note that when the tone value is equal to or larger than the first threshold and smaller than the second threshold, an exposed area of the second region is smaller than an exposed area of the first region. When the tone value is equal to the second threshold, every pixel in the dither matrix has the same exposed area. Note that when the tone value is equal to the second threshold, every pixel in the dither matrix has an unexposed portion.

In the foregoing dithering processing according to the present embodiment, in a low-tone range, that is, when the tone value is between 0 and 143, exposed regions of pixels abut one another with no distance therebetween. This can restrain the occurrence of tone jump—a phenomenon in which, when a toner image is formed by developing an electrostatic latent image, the image density suddenly rises because the amount of toner drastically increases along with an increase in the number of tones. As humans have high visual sensitivity to a change in density especially in the low-tone range, prevention of tone jump is crucial to the achievement of favorable image quality.

On the other hand, in an intermediate-tone range, that is, when the tone value is between 143 and 171, pixels that are unexposed to light when the tone value is 143 have increasing exposed portions, whereas pixels that are entirely exposed to light when the tone value is 143 have decreasing exposed regions, as the tone value increases. As a result, exposed regions of the pixels composing the dither matrix are dispersed, and when the tone value is 171, all pixels have exposed regions of the same size. Furthermore, in a high-tone range, that is, when the tone value is 172 or above, exposed regions of the pixels are increased while maintaining the state in which every pixel has an exposed region, and when the tone value is 255, the entire region of every pixel is exposed to light.

Figure 9:
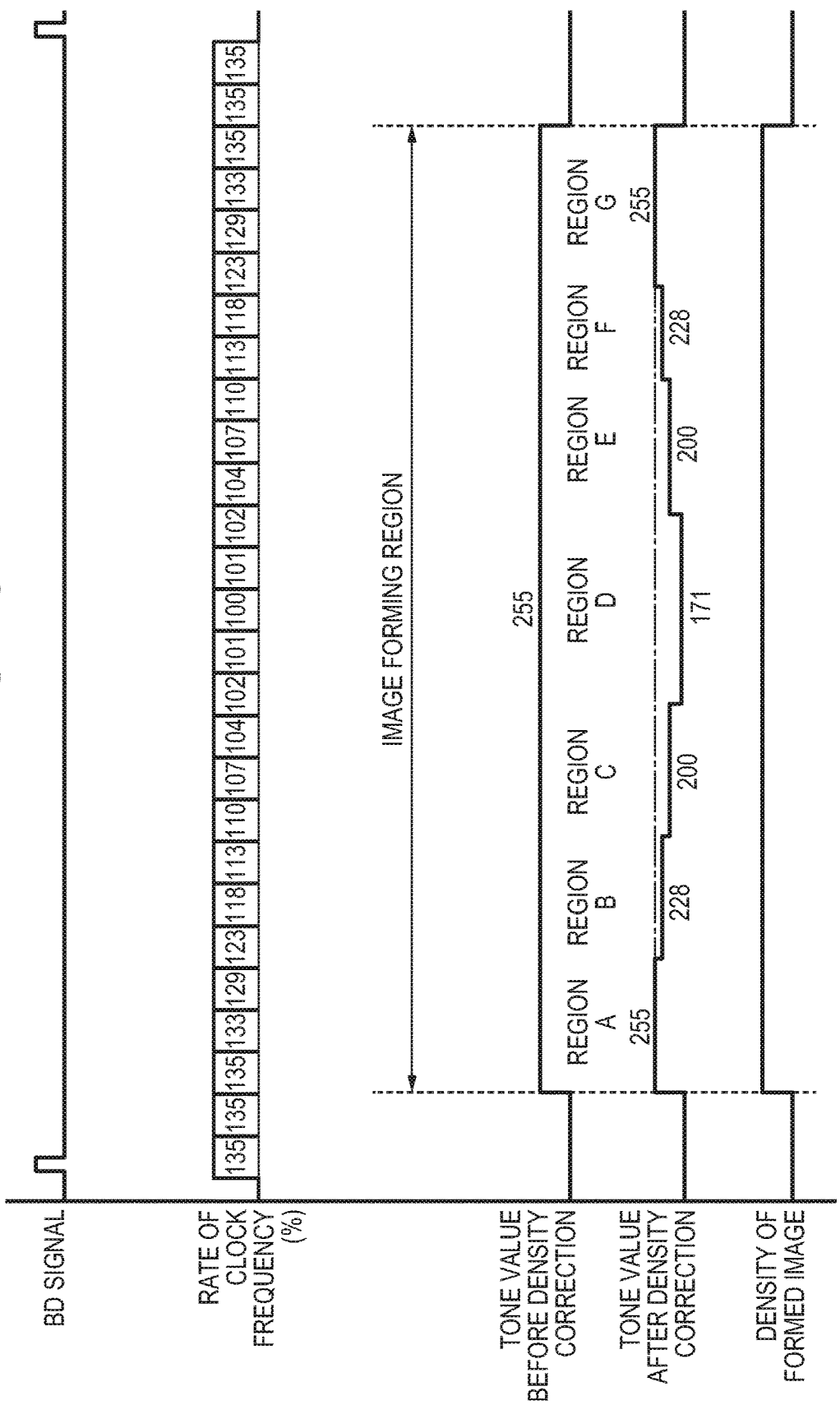
FIG. 9 is a diagram for describing density correction processing according to an embodiment.

The density correction processing executed by the density correction processing unit 101z will now be described. As stated earlier, in the optical scanning apparatus 400 according to the present embodiment, the scanning speed for the out-of-axis image heights is higher than the scanning speed for the on-axis image height. Therefore, in the present embodiment, the clock speed is adjusted to restrain a single-pixel width in the main scanning direction from fluctuating depending on an image height. Specifically, as shown in FIG. 9, the clock frequency is set at 100% for the on-axis image height, and increases toward the maximum out-of-axis image height. In the optical scanning apparatus 400 according to the present embodiment, as the maximum out-of-axis image height corresponds to a partial magnification of 35%, the clock frequency for the maximum out-of-axis image height is set at 135%.

Although adjusting the clock frequency can restrain a pixel size from fluctuating depending on an image height, a total exposure amount per unit length decreases depending on an image height due to fluctuations in the scanning speed. In view of this, in the present embodiment, tone values of pixels indicated by image data are corrected to restrain density fluctuations. FIG. 9 shows the density correction processing executed when all pixels lined up in the main scanning direction have a tone value of 255. In the present embodiment, seven regions A to G are generated by division in the main scanning direction, and correction is performed on a per-region basis. In regions A and G that include the maximum out-of-axis image height, the post-correction tone value is still 255. In regions B and F, which are respectively next to regions A and G and closer to the on-axis image height than regions A and G, the post-correction tone value is 228. In regions C and E, which are respectively next to regions B and F and closer to the on-axis image height than regions B and F, the post-correction tone value is 200. In region D that includes the on-axis image height, the post-correction tone value is 171. As described above, in the correction performed in the present embodiment, the tone value is reduced as the scanning speed decreases, using the maximum out-of-axis image height as a reference. As a result, density fluctuations depending on an image height are restrained. Note that region-by-region correction information that is used by the density correction processing unit 101z in performing the density correction is obtained in advance based on the exposure sensitivity characteristics of the photosensitive member 4 and the developing characteristics of toner, and stored to the density correction processing unit 101z.

Figure 10:
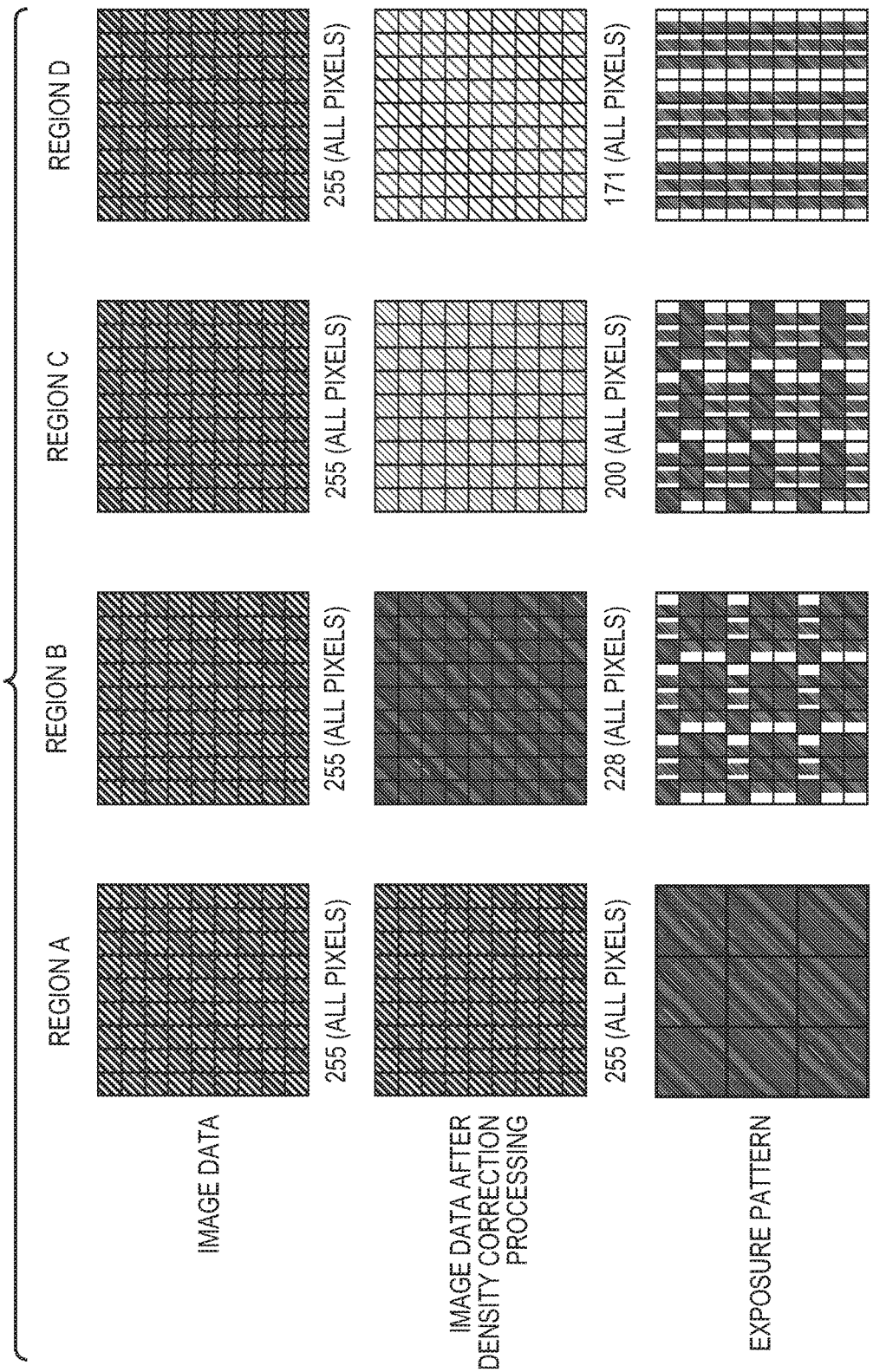
FIG. 10 shows exposure patterns for a solid image according to an embodiment.

FIG. 10 is a diagram for describing an exposed state for an image in which all pixels have a tone value of 255. Note that FIG. 10 shows a range corresponding to nine dither matrices. As shown in FIG. 9, after the density correction processing, the tone value is 255 in region A, 228 in region B, 200 in region C, and 171 in region D. Note that regions E, F, and G are similar to regions C, B, and A, respectively. In region A, every pixel is exposed to light using a PWM value of 255. In region B, some pixels are exposed to light using a PWM value of 150. In region C, some pixels are exposed to light using a PWM value of 150, and the number of such pixels exposed to light using a PWM value of 150 is large compared with region B. In region D, every pixel is exposed to light using a PWM value of 150.

Figure 11:
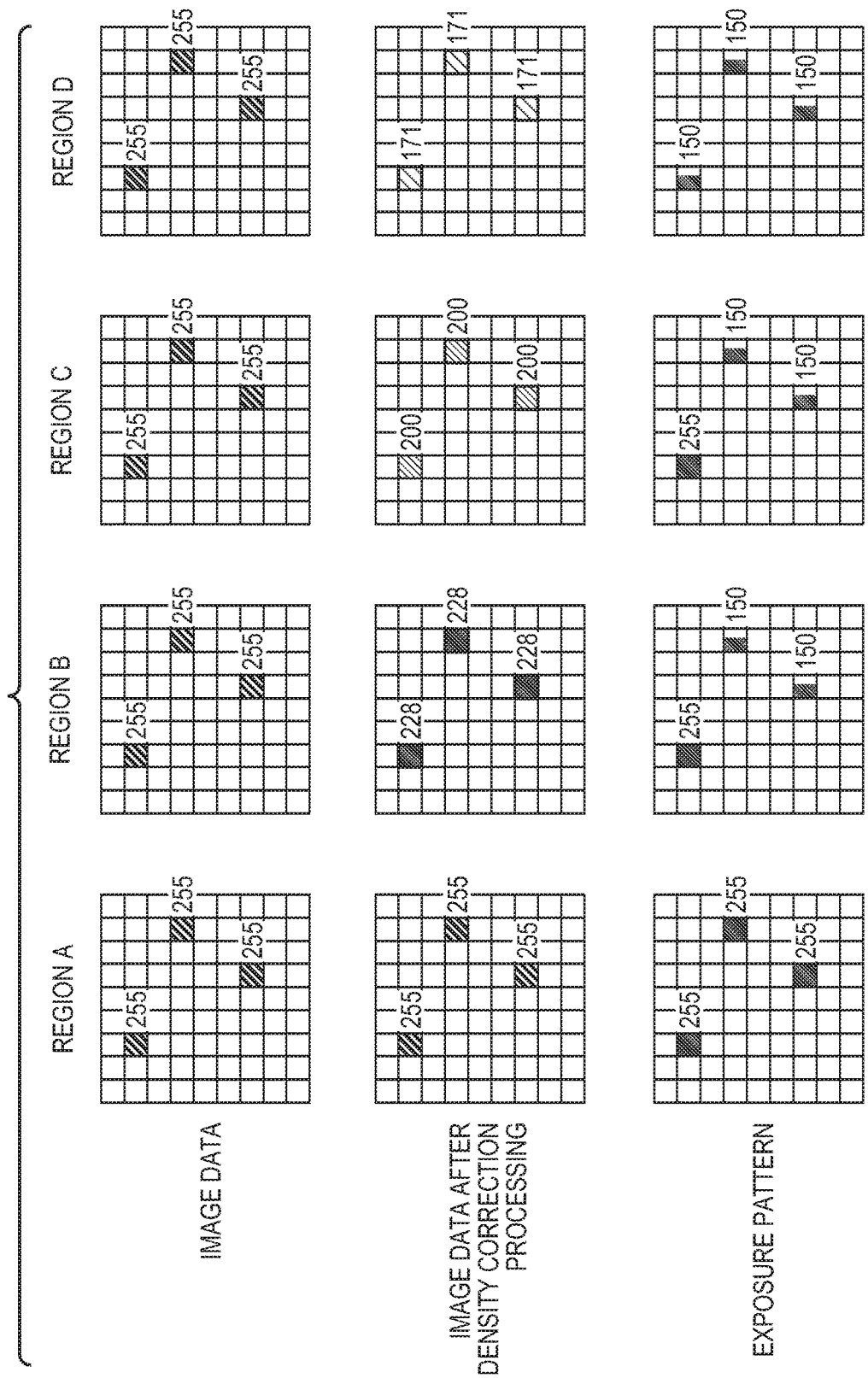
FIG. 11 shows exposure patterns for an image having isolated pixels according to an embodiment.

FIG. 11 is a diagram for describing an exposed state for another image. In the example of FIG. 11, image data indicates that three pixels have a tone value of 255 and other pixels have a tone value of 0. It will be assumed that the pixels having a tone value of 255 are positioned as shown in FIG. 11. Similarly to FIG. 10, as a result of the density correction processing, the tone value of 255 is corrected to 255 in region A, 228 in region B, 200 in region C, and 171 in region D. Similarly to FIG. 10, in region A, all three pixels are exposed to light using a PWM value of 255. In regions B and C, one pixel is exposed to light using a PWM value of 255, and two pixels are exposed to light using a PWM value of 150. In region D, all three pixels are exposed to light using a PWM value of 150.

Figure 12:
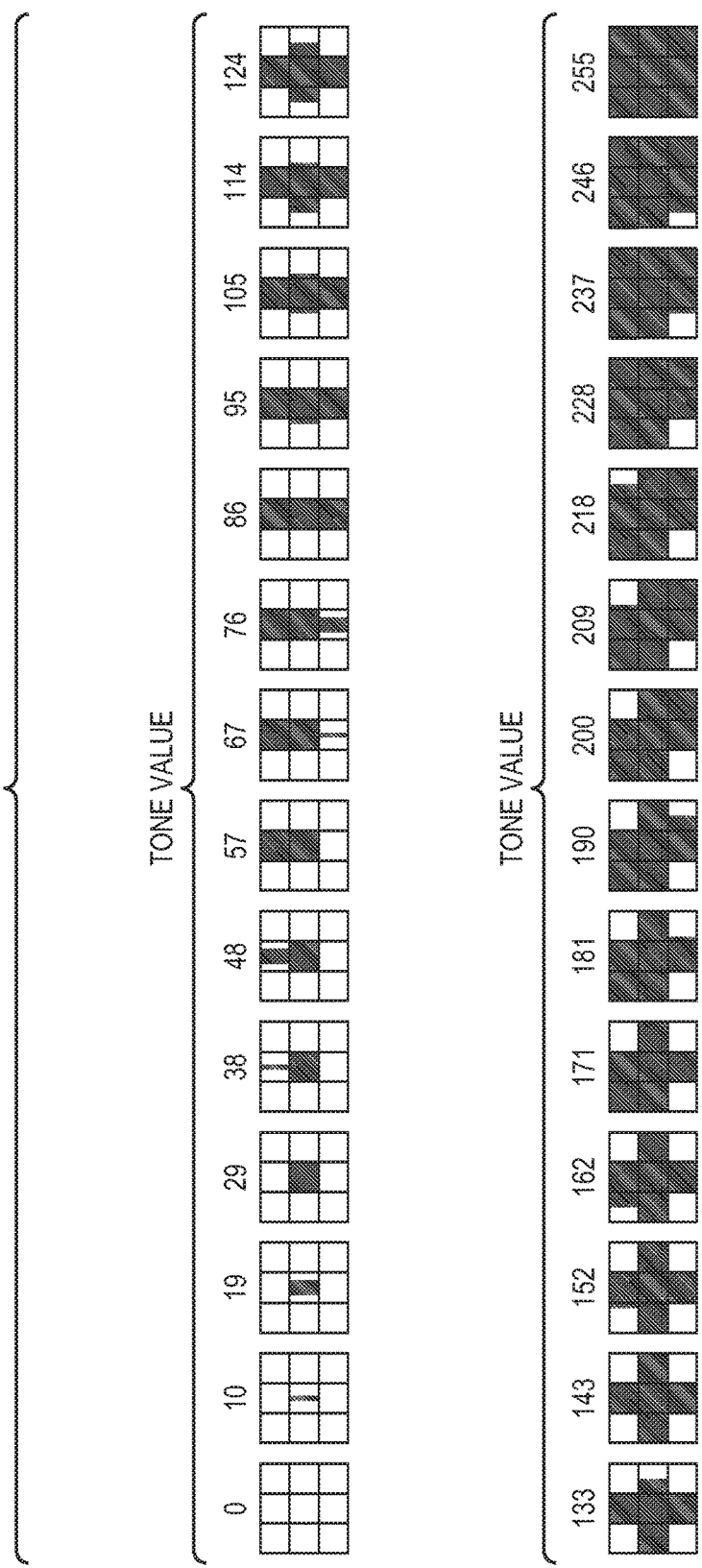
FIG. 12 shows a relationship between tone values and exposed portions according to an embodiment.

In the present embodiment, as shown in FIG. 8, when the tone value is larger than 143 and equal to or smaller than 171, exposed regions decrease in pixels b, d, e, f, and h as the tone value increases. For comparison, dithering processing shown in FIG. 12 will now be discussed. FIG. 12 is similar to FIG. 8 when the tone value is between 0 and 143; however, when the tone value exceeds 143, pixels b, d, e, f, and h are maintained in the state in which their entire regions are exposed to light.

FIG. 13 is a diagram for describing an exposed state for an image in which all pixels have a tone value of 255, in relation to application of the dithering processing shown in FIG. 12. In region A, every pixel is exposed to light using a PWM value of 255. In regions B to D, many pixels are exposed to light using a PWM value of 255, but some pixels are unexposed to light. Note that the number of unexposed pixels ascends in the order of regions B, C, and D.

FIG. 14 is a diagram for describing an exposed state for an image in which three pixels have a tone value of 255, in relation to application of the dithering processing shown in FIG. 12. As shown in FIG. 14, in regions A and B, all three pixels are exposed to light using a PWM value of 255. On the other hand, in regions C and D, two pixels are exposed to light using a PWM value of 255, and one pixel is unexposed to light. The unexposed pixel corresponds to pixel c; this is because, as shown in FIG. 12, pixel c is unexposed to light when the tone value is 171 or 200. In contrast, in the present embodiment, when the tone value is 171 or above, there is no unexposed pixel as shown in FIG. 8, and hence the loss of an isolated pixel (a pixel surrounded by unexposed pixels) can be effectively restrained as shown in FIG. 11. As described above, the density correction processing unit 101$z$ corrects the maximum tone value in accordance with an image height. In the present example, the density correction processing unit 101$z$ corrects the maximum tone value in accordance with an image height so that the maximum post-correction tone value is equal to or smaller than the maximum pre-correction tone value. In the example of FIG. 9, the maximum pre-correction tone value is 255, and the density correction processing unit 101$z$ corrects this maximum pre-correction tone value to 255, 228, 200 and 171 in regions A, B, C, and D, respectively. In the halftone processing executed by the halftone processing unit 101$a$, the second threshold (a tone value of 171 in FIG. 8) is set at or below the smallest value (171 in FIG. 9) among the maximum tone values in the regions after the density correction. This configuration can restrain the loss of an isolated pixel as shown in FIG. 11.

Figure 15A:
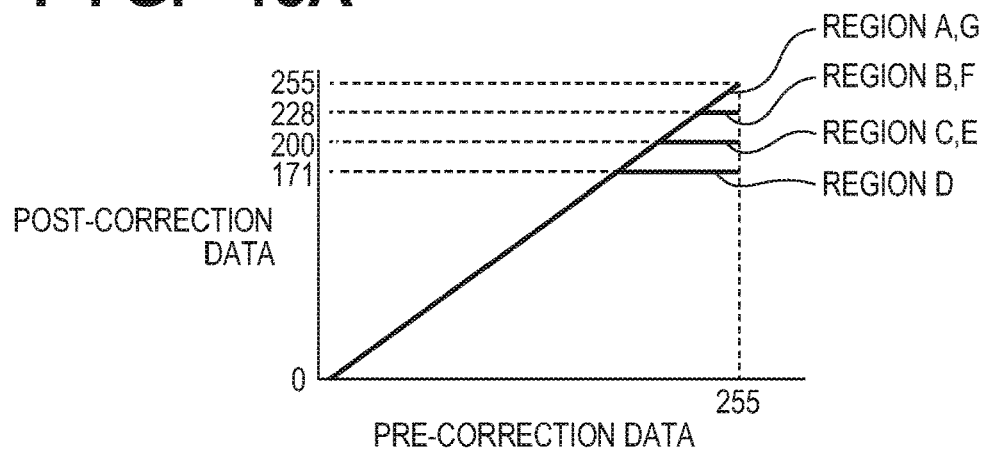
FIGS. 15A to 15C show correction information according to an embodiment.
Figure 15B:
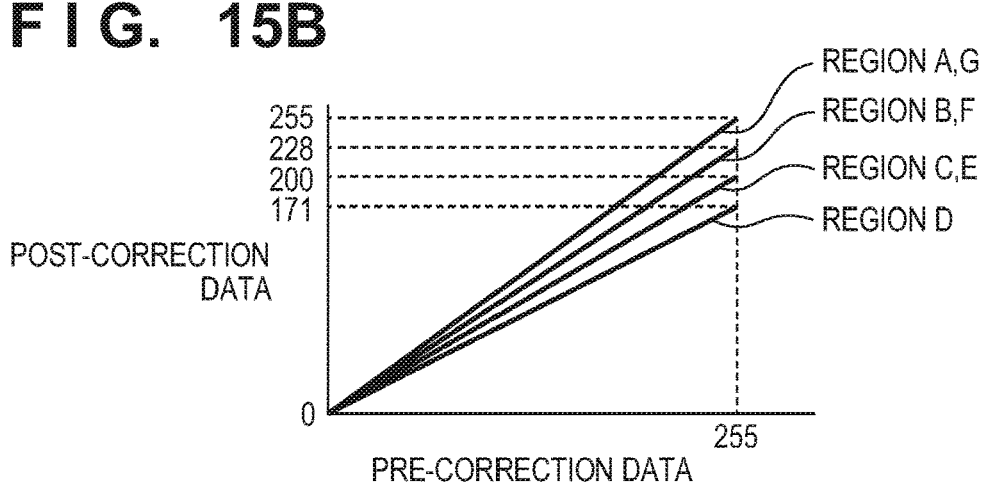
Figure 15C:
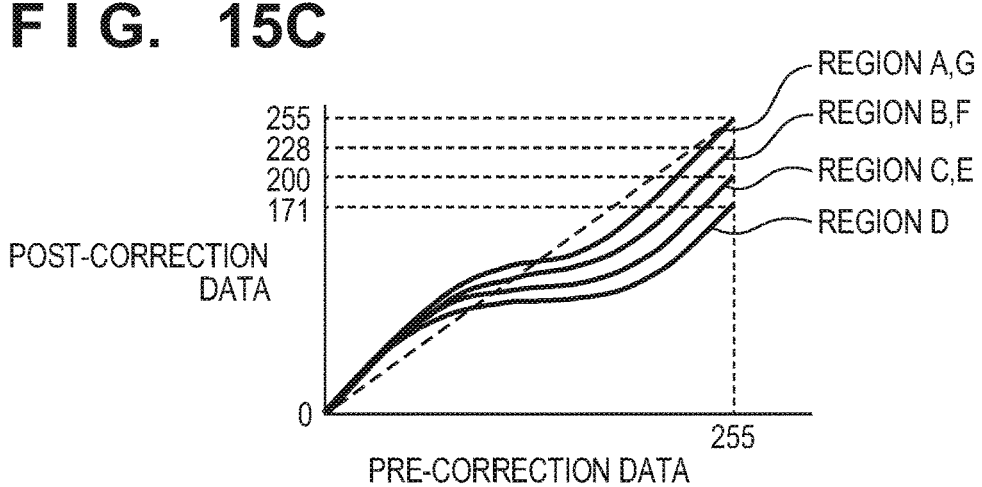

The correction information held by the density correction processing unit 101$z$ will now be described. FIG. 15A shows an example of the correction information. As stated earlier, the maximum post-correction tone value is determined for each of regions A to G. In FIG. 15A, for each region, when the pre-correction tone value is equal to or smaller than the maximum post-correction tone value, the post-correction tone value remains the same as the pre-correction tone value. On the other hand, when the pre-correction tone value is equal to or larger than the maximum post-correction tone value, the maximum post-correction tone value is used as the pre-correction tone value. According to FIG. 15A, an image of any intermediate tone values can be formed, and the density correction processing can be simplified. In FIG. 15B, as the pre-correction tone value increases from the minimum value (0) to the maximum value (255), the post-correction tone value increases linearly from the minimum value (0) to the region-by-region maximum value. According to FIG. 15B, the post-correction tone value increases linearly in relation to the pre-correction tone value, and an image having the continuous tone characteristics can be formed. In FIG. 15C, similarly to FIG. 15B, the post-correction tone value increases as the pre-correction tone value increases. However, according to the correction information shown in FIG. 15C, the post-correction tone value does not increase linearly as the pre-correction tone value increases. This is because, depending on the characteristics of the photosensitive member 4, developer, toner, and the like, density fluctuations in a scanning direction can be restrained to a greater extent when the post-correction tone value increases non-linearly as the pre-correction tone value increases. As described above, a relationship between pre-correction tone values and post-correction tone values can be obtained in advance in accordance with the characteristics of the photosensitive member 4 so as to achieve constant density in a scanning direction regardless of fluctuations in the scanning speed, and the relationship thus obtained can be used as the correction information.

Figure 23A:
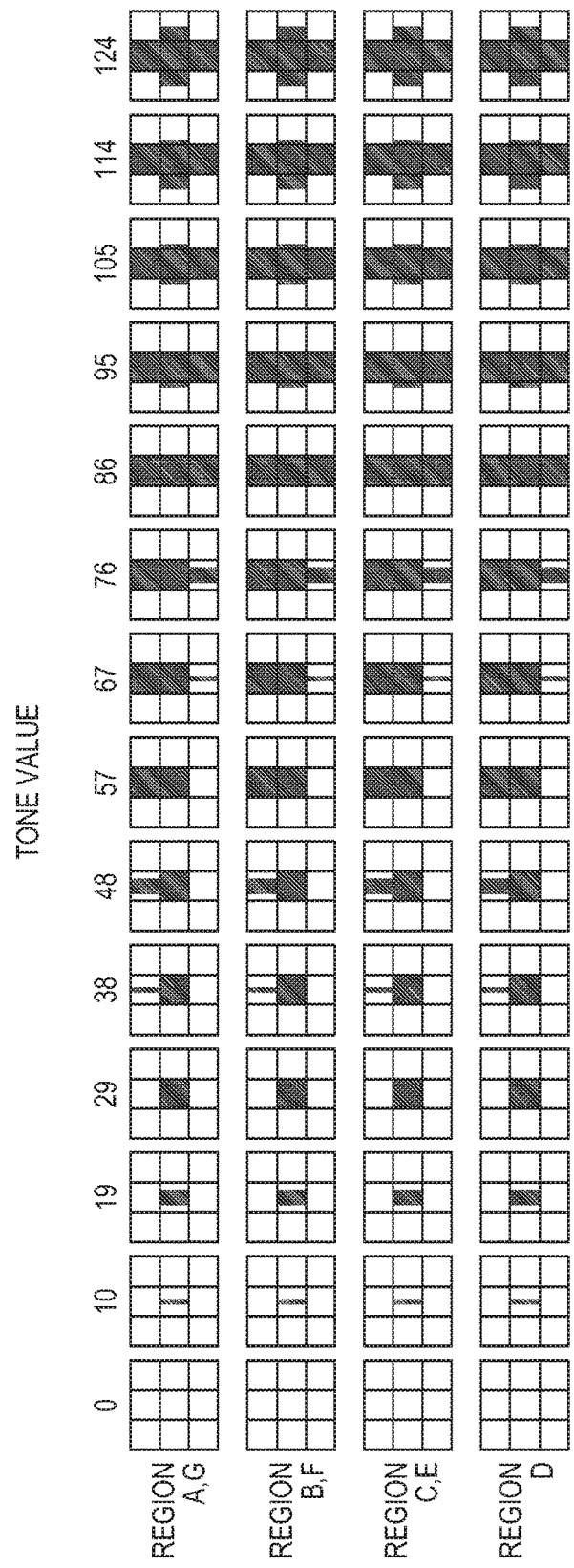
FIGS. 23A and 23B show relationships between tone values and exposed portions according to an embodiment in correspondence with image heights.
Figure 23B:
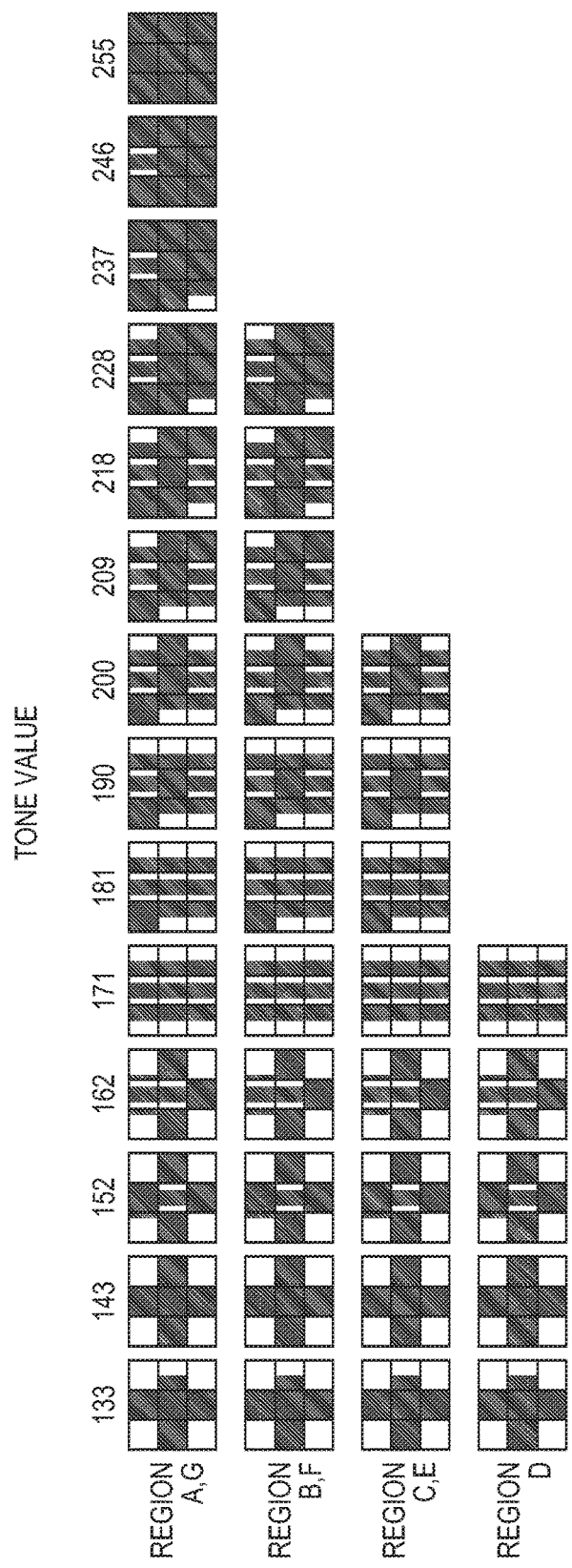

FIGS. 23A and 23B show dither matrices according to the present embodiment on a per-region basis. As described above, the density correction processing unit 101$z$ corrects the maximum tone value on a per-region basis. In the present example, in regions A and G, dither matrices corresponding to the tone values of 0 to 255 are used. In regions B and F, dither matrices corresponding to the tone values of 0 to 228 are used. In regions C and E, dither matrices corresponding to the tone values of 0 to 200 are used. In region D, dither matrices corresponding to the tone values of 0 to 171 are used.

Second Embodiment

Figure 16:
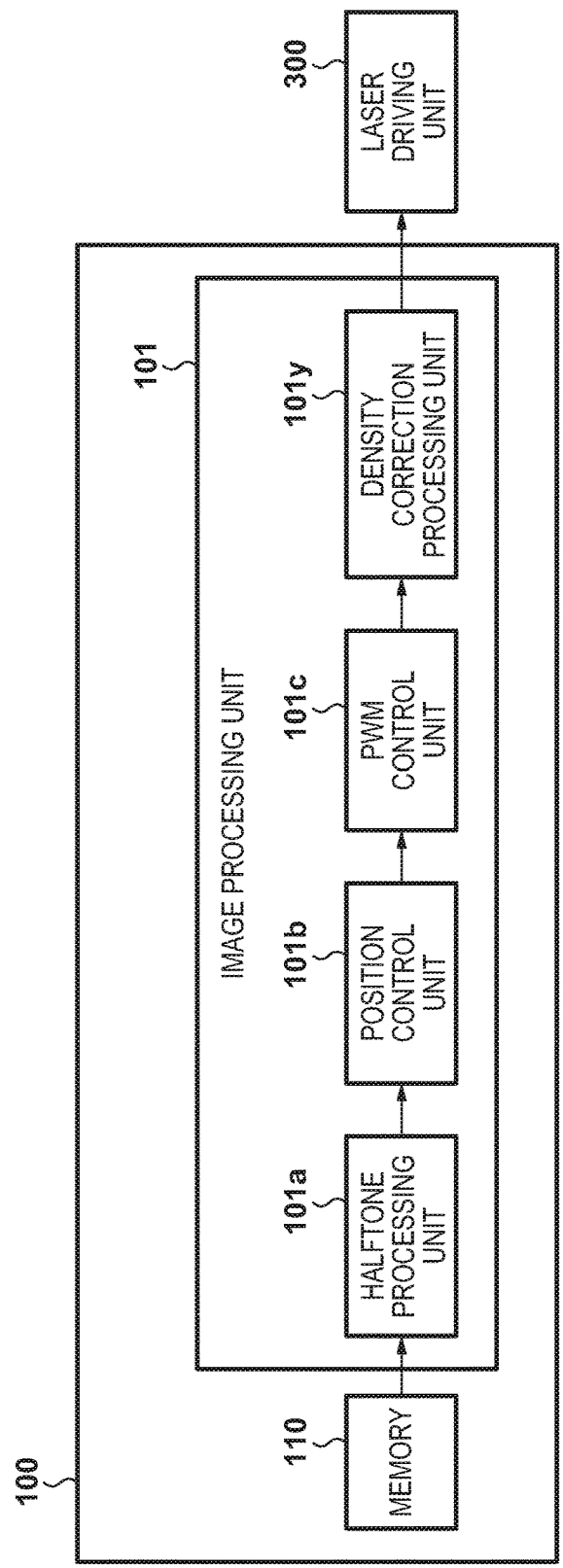
FIG. 16 shows a configuration of an image signal generation unit according to an embodiment.

The following describes a second embodiment with a focus on differences from the first embodiment. FIG. 16 shows a configuration of an image signal generation unit 100 according to the present embodiment. This configuration differs from the configuration according to the first embodiment shown in FIG. 4 in that density correction processing is applied to a PWM signal rather than being executed before halftone processing. Therefore, in the present embodiment, a density correction processing unit 101$y$ is provided in place of the density correction processing unit 101$z$. In the present embodiment, it will be assumed that dither matrices grow as shown in FIG. 12 in dithering processing executed by a halftone processing unit 101$a$.

In the present embodiment, the density correction processing unit 101$y$ corrects density by adjusting a pulse width of a PWM signal in accordance with correction information. That is, the density correction processing unit 101$y$ adjusts an exposed region of each pixel. As changing of a pulse width of a PWM signal is equivalent to changing of a PWM value (see FIG. 7), the following description focuses on a PWM value.

Figure 17:
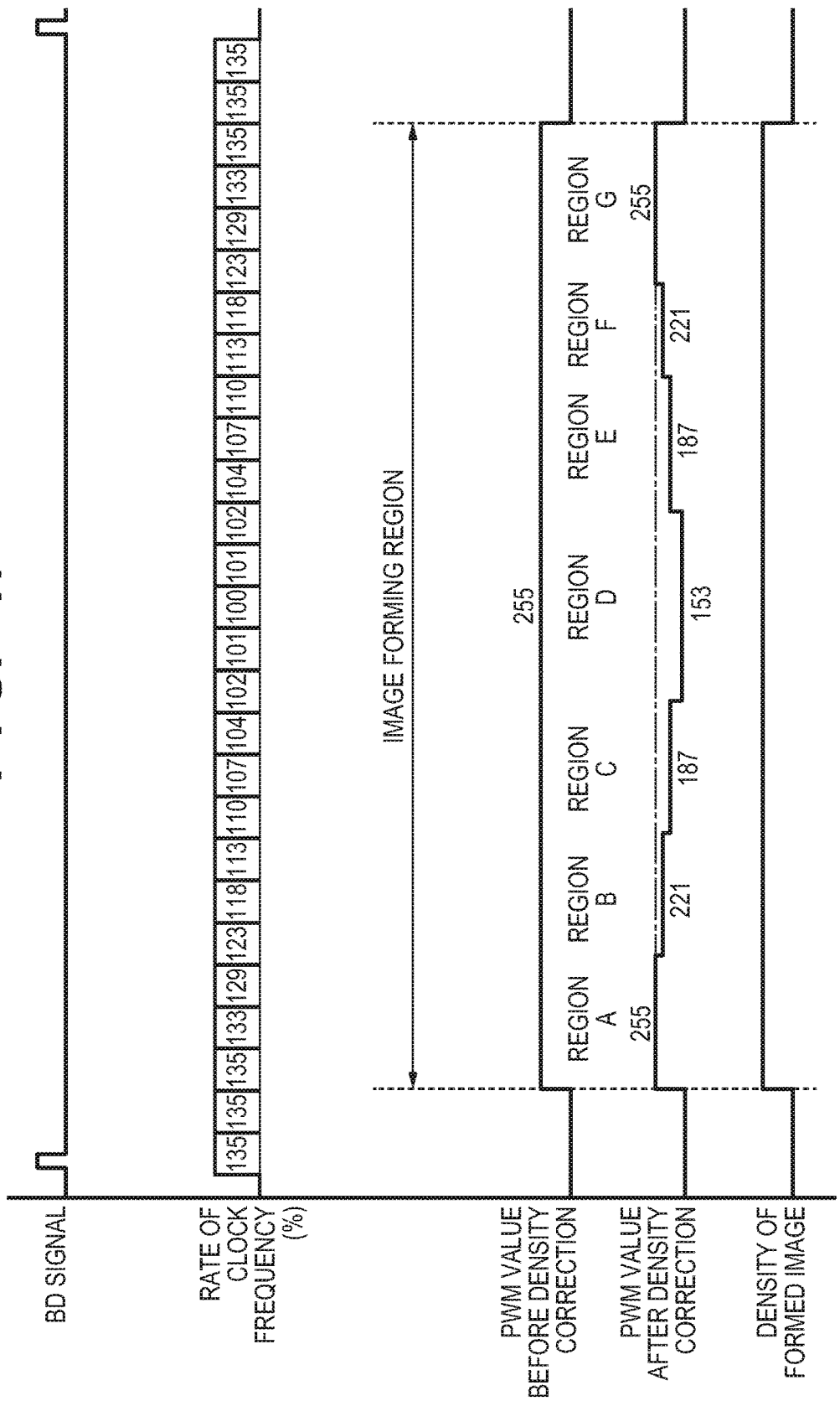
FIG. 17 is a diagram for describing density correction processing according to an embodiment.

FIG. 17 is a diagram for describing the density correction processing according to the present embodiment. Similarly to the first embodiment, seven regions A to G are generated by division in the main scanning direction, and correction is performed on a per-region basis. In FIG. 17, in regions A and G, the post-correction PWM value is the same as the pre-correction PWM value, that is, 255. In other regions, the post-correction PWM value is smaller than the pre-correction PWM value. Specifically, the post-correction PWM value is 221 in regions B and F, 187 in regions C and E, and 153 in region D.

Figure 18:
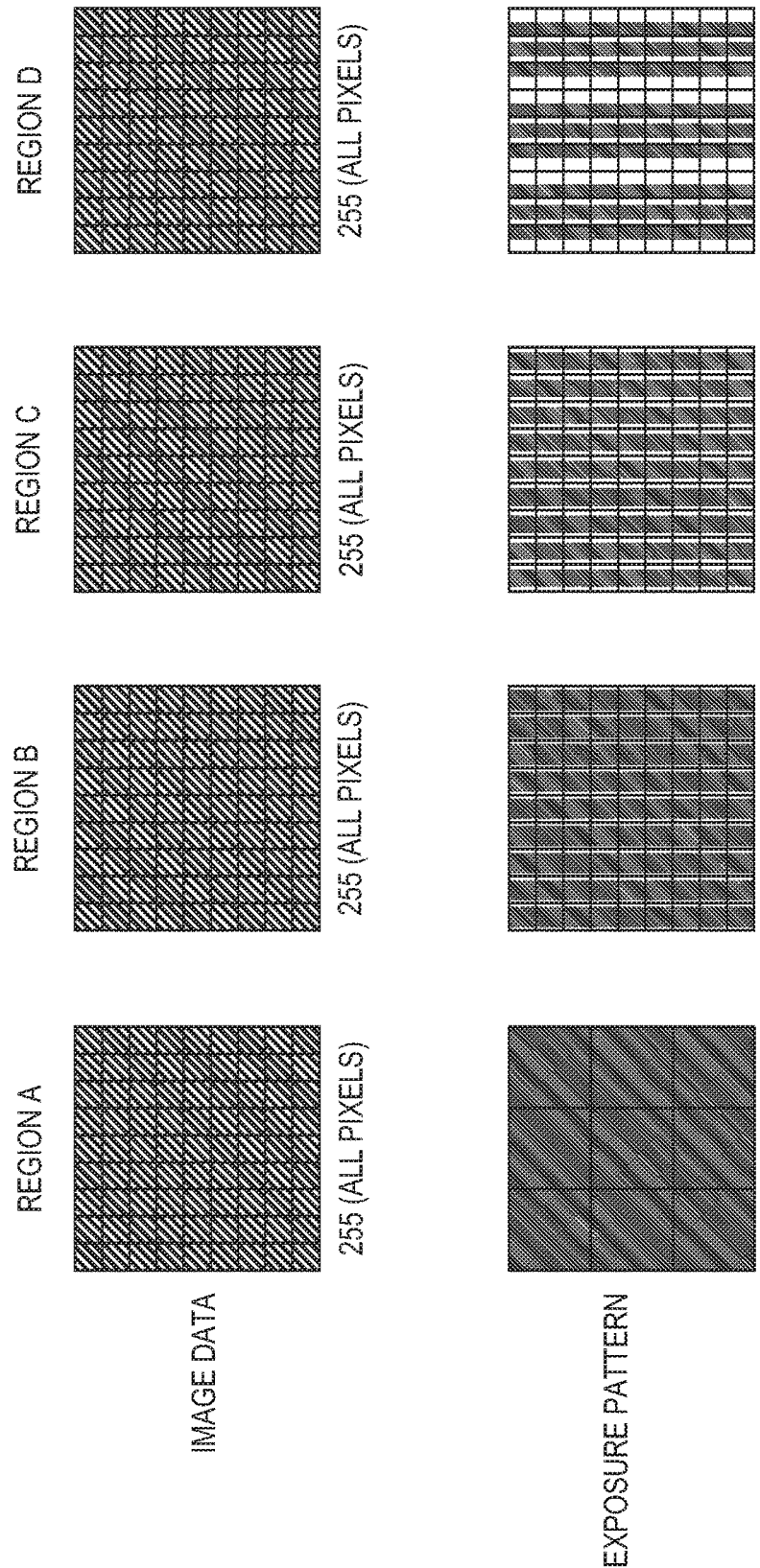
FIG. 18 shows exposure patterns for a solid image according to an embodiment.
Figure 19:
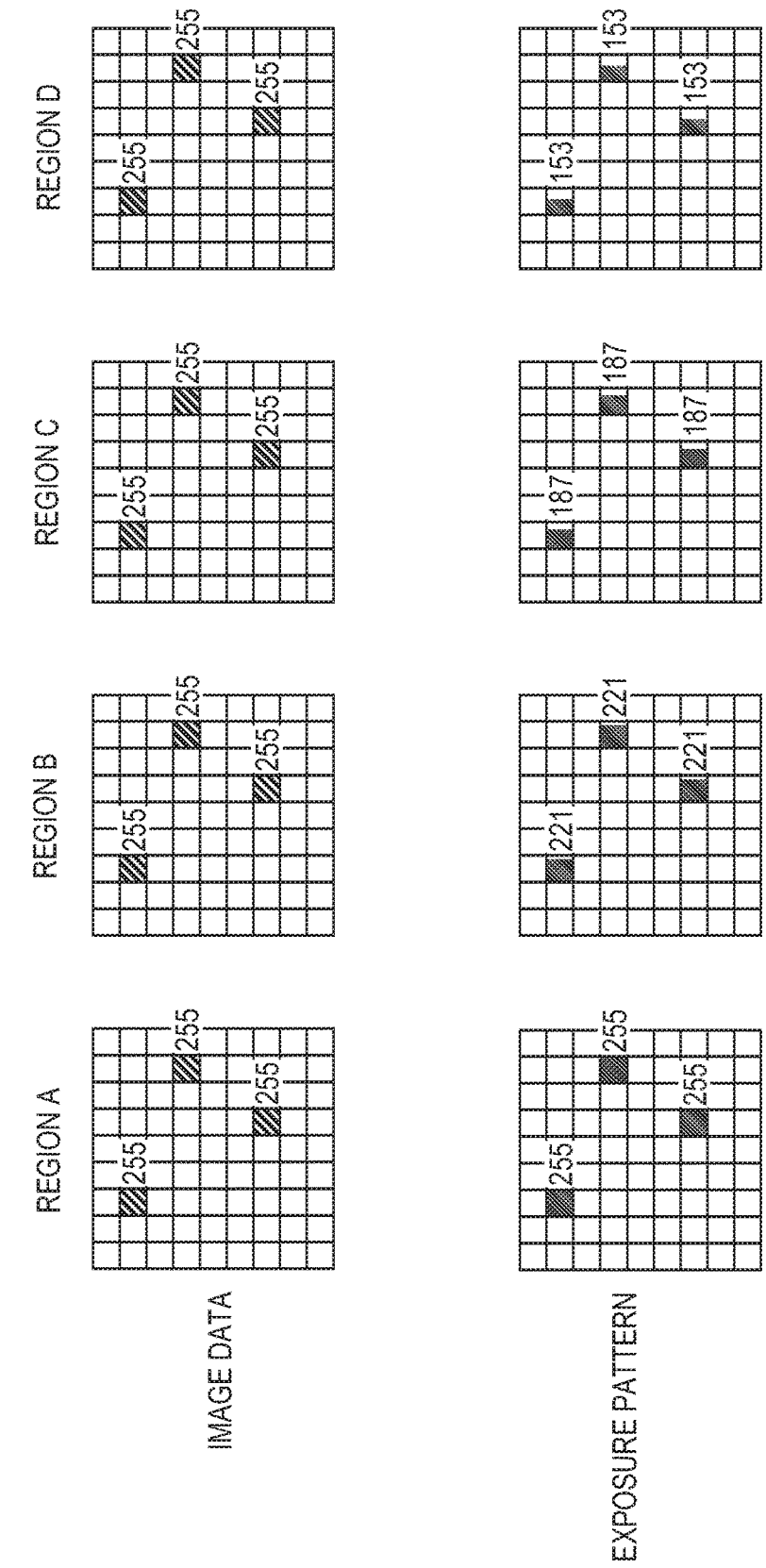
FIG. 19 shows exposure patterns for an image having isolated pixels according to an embodiment.

FIG. 18 is a diagram for describing an exposed state for an image in which all pixels have a tone value of 255. As shown in FIG. 17, regions A, B, C, and D are exposed to light using PWM values of 255, 221, 187, and 153, respectively. FIG. 19 shows image data indicating that three pixels have a tone value of 255 and other pixels have a tone value of 0. It will be assumed that the pixels having a tone value of 255 are positioned as shown in FIG. 19. As a result of the density correction processing, the PWM value 255 is corrected to 255 in region A, 221 in region B, 187 in region C, and 153 in region D. Note that in all of regions A to D, the three isolated pixels are exposed to light without being lost.

Figure 20A:
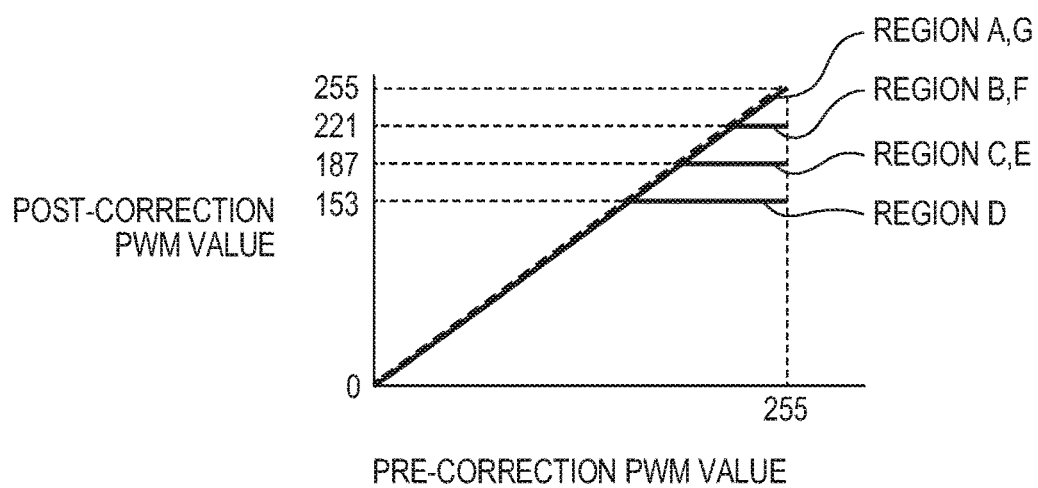
FIGS. 20A and 20B show correction information according to an embodiment.
Figure 20B:
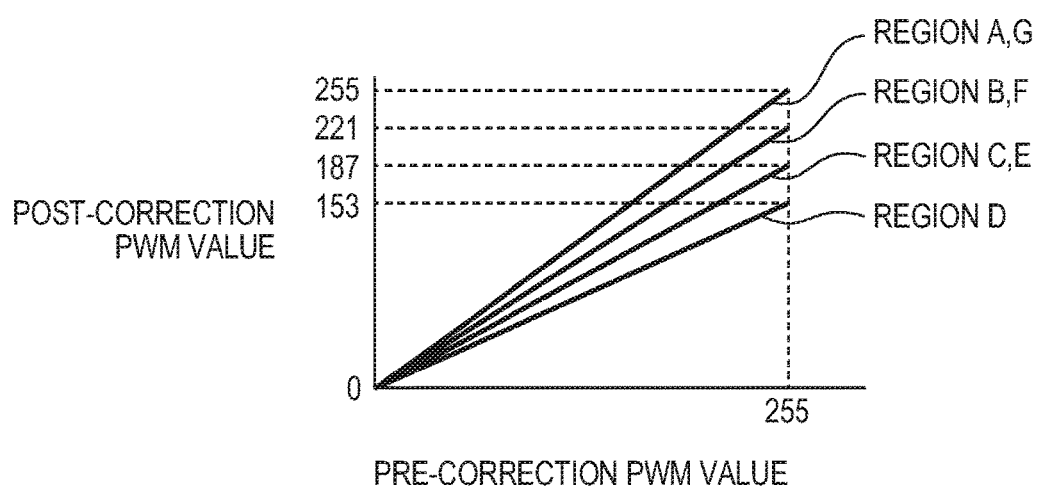
Figure 21A:
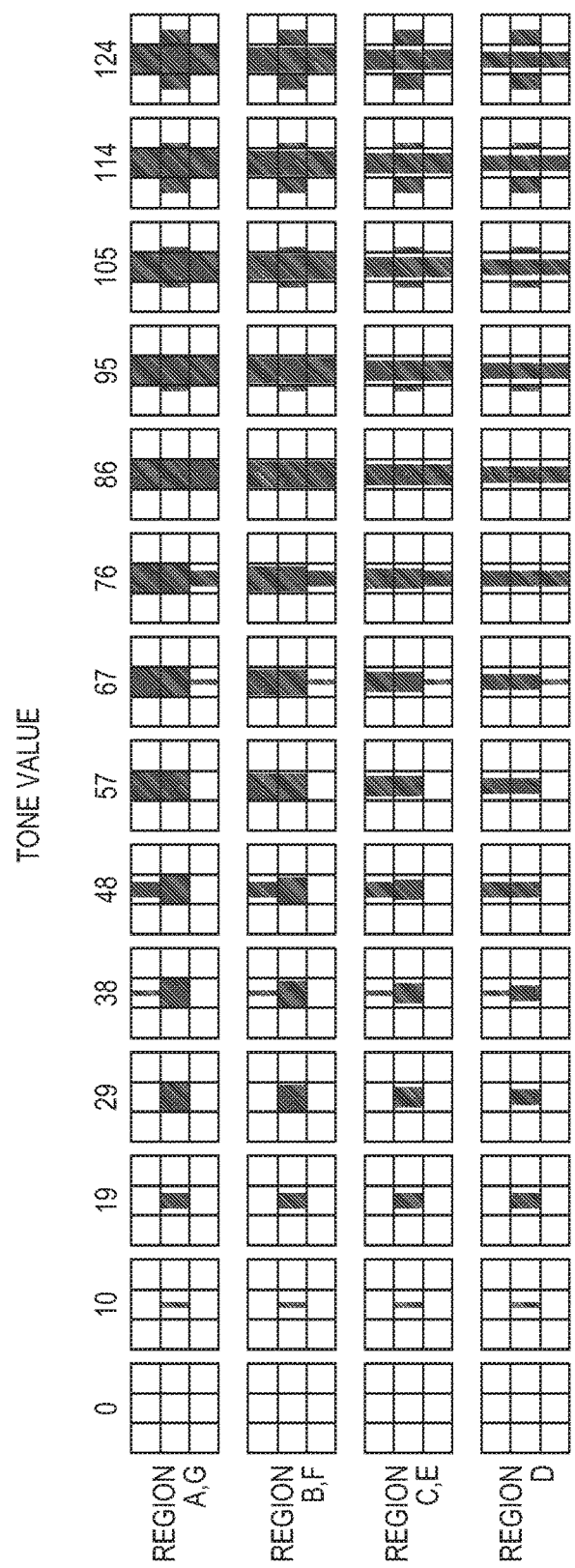
Figure 22A:
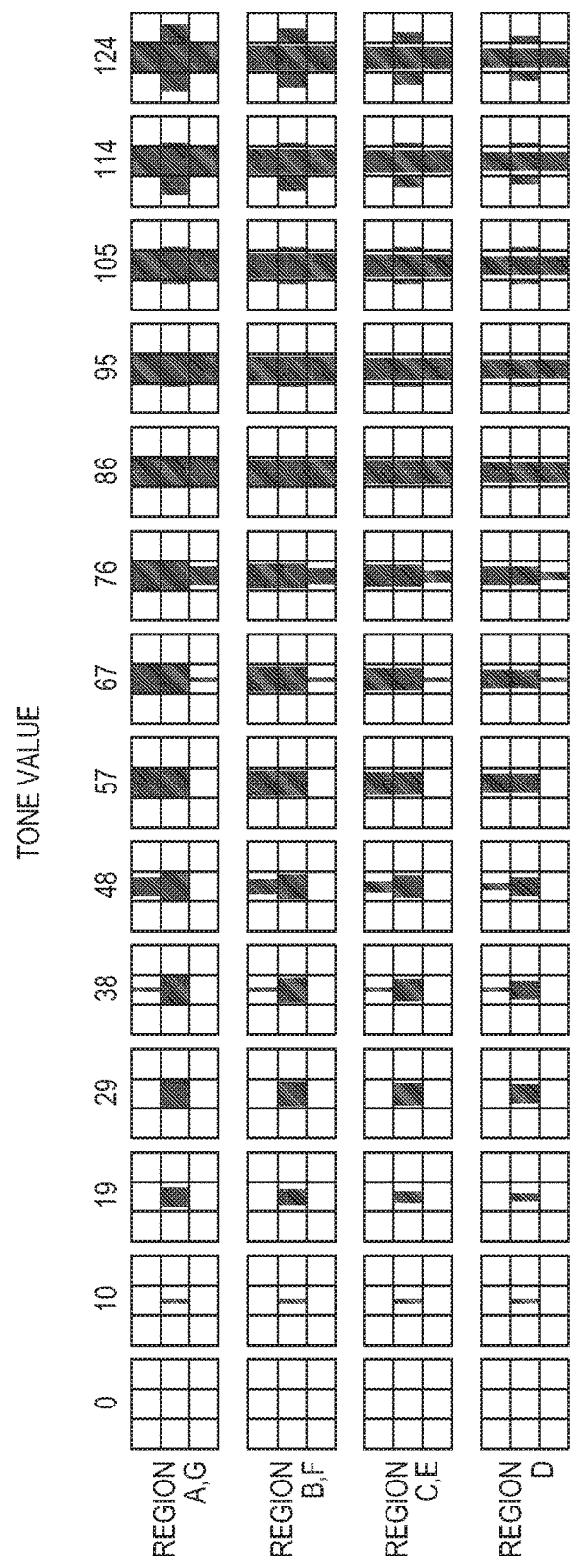
FIGS. 22A and 22B show relationships between tone values and exposed portions according to an embodiment.
Figure 22B:
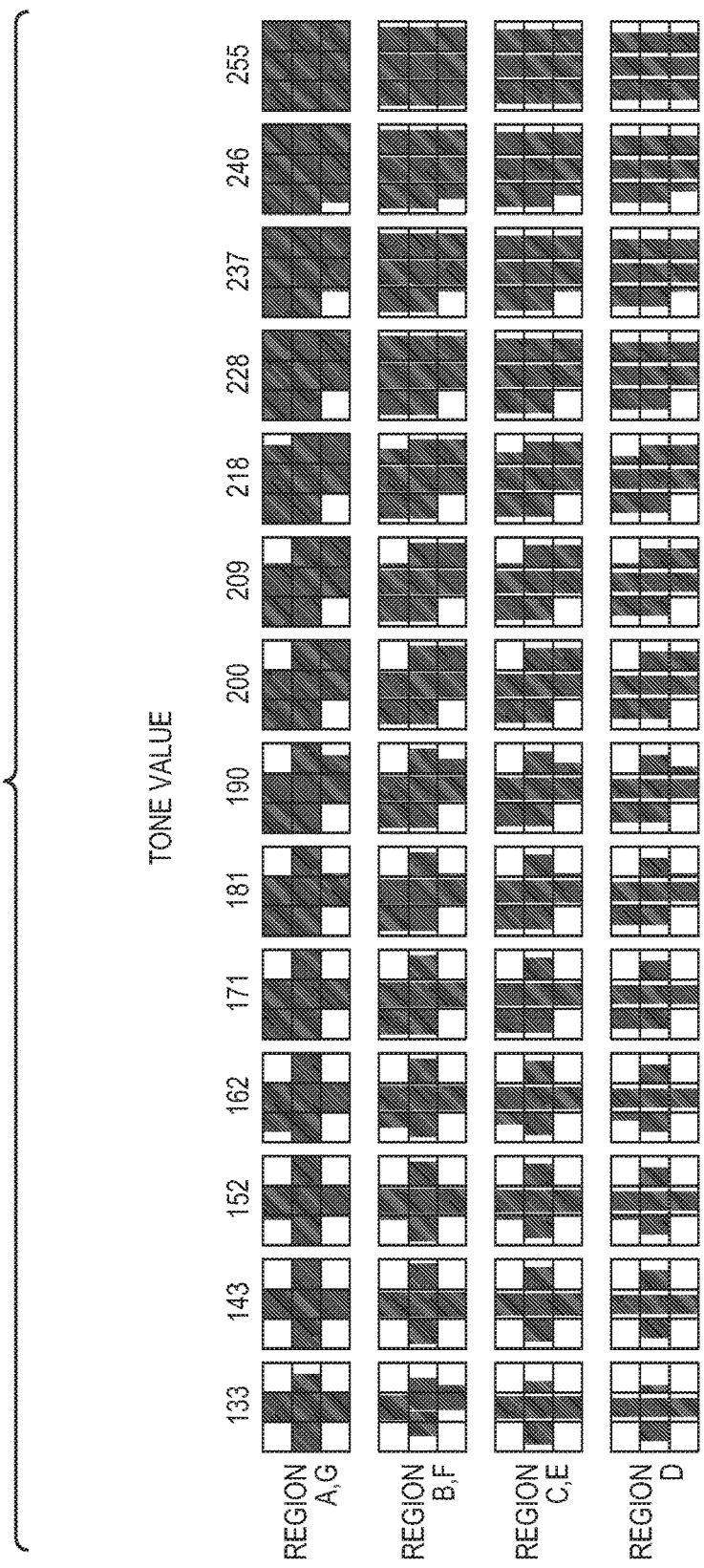

FIGS. 20A and 20B show examples of the correction information according to the present embodiment. FIG. 20A is similar to FIG. 15A according to the first embodiment; for each region, the post-correction PWM value remains the same as the pre-correction PWM value as long as the pre-correction PWM value does not exceed the maximum PWM value. On the other hand, FIG. 20B is similar to FIG. 15B according to the first embodiment; for each region, the post-correction PWM value increases linearly to the maximum PWM value as the pre-correction PWM value increases. Note that the increase may be non-linear as shown in FIG. 15C. FIGS. 21A and 21B show relationships between tones and exposed states for a case in which the correction information shown in FIG. 20A is used. On the other hand, FIGS. 22A and 22B show relationships between tones and exposed states for a case in which the correction information shown in FIG. 20B is used.

Unlike the first embodiment, the present embodiment does not impose any restriction on a tone range, and hence can achieve favorable halftone characteristics that guarantee the number of tones. Furthermore, even in the case of an image having isolated pixels, the pixels have a uniform PWM value as shown in FIG. 19, and a favorable image can be formed.

The first embodiment and the second embodiment may be combined to perform density correction before dithering processing, and perform further density correction by adjusting a pulse width of a PWM signal.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-106715, filed on May 27, 2016, which is hereby incorporated by reference herein in its entirety.

What is claimed is:

1. An image forming apparatus, comprising:
   a photosensitive member;
   a correction unit configured to correct a tone of each pixel in first image data in accordance with an image height on the photosensitive member, and output resultant second image data;
   a halftone processing unit configured to determine exposed regions of pixels in an image to be formed by applying halftone processing to the second image data using a multi-pixel dither matrix; and
   a scanning unit configured to form a latent image by scanning the photosensitive member with light that changes in scanning speed in accordance with an image height based on the exposed regions of the pixels determined by the halftone processing unit,
   wherein the scanning unit is further configured to perform partial exposure with respect to the pixels based on the exposed regions of the pixels, the partial exposure exposing partial regions of the pixels to light unlike entire exposure that exposes entire regions of the pixels to light.

2. The image forming apparatus according to claim 1, wherein
   the scanning unit is further configured to
   perform the partial exposure with respect to the pixels when the dither matrix has a first tone value, and
   perform the entire exposure with respect to at least one of the pixels when the dither matrix has a second tone value larger than the first tone value.

3. The image forming apparatus according to claim 2, wherein
   the scanning unit is further configured to perform the entire exposure with respect to the pixels when the dither matrix has a third tone value that is the largest tone value.

4. The image forming apparatus according to claim 2, wherein
   among the pixels, a number of pixels that undergo the entire exposure performed by the scanning unit increases as a tone value of the dither matrix becomes larger than the first tone value.

5. The image forming apparatus according to claim 2, wherein
   the scanning unit is further configured to, when a tone value of the dither matrix is in a range of a fourth tone value smaller than the first tone value to the first tone value, gradually increases and then reduces an exposed region of at least one of the pixels as the tone value of the dither matrix increases from the fourth tone value to the first tone value.

6. The image forming apparatus according to claim 5, wherein
   the scanning unit is further configured to perform the entire exposure with respect to at least one of the pixels when the tone value of the dither matrix is in the range of the fourth tone value to the first tone value.

7. The image forming apparatus according to claim 2, wherein an exposed region of a first pixel at the first tone value is larger than an exposed region of the first pixel at a fifth tone value that is smaller than the first tone value.

8. The image forming apparatus according to claim 2, wherein an exposed region of a second pixel at the first tone value is smaller than an exposed region of the second pixel at a sixth tone value that is smaller than the first tone value.

9. The image forming apparatus according to claim 1, wherein
a maximum tone value of a pixel in the second image data is equal to or smaller than a maximum tone value of the pixel in the first image data, and varies depending on an image height of the pixel on the photosensitive member.

10. The image forming apparatus according to claim 9, wherein
the maximum tone value of the pixel in the second image data decreases as the scanning speed of the scanning unit for the image height of the pixel on the photosensitive member decreases.

11. An image forming apparatus, comprising:
a photosensitive member;
a correction unit configured to correct a tone of each pixel in first image data in accordance with an image height on the photosensitive member, and output resultant second image data;
a halftone processing unit configured to determine exposed regions of pixels in an image to be formed by applying halftone processing to the second image data using a multi-pixel dither matrix; and
a scanning unit configured to form a latent image by scanning the photosensitive member with light that changes in scanning speed in accordance with an image height based on the exposed regions of the pixels determined by the halftone processing unit,
wherein pixels in the dither matrix are each classified as a pixel in a first region and a pixel in a second region, and
in the halftone processing, an exposed area of the first region is smaller when a tone value of the dither matrix is larger than a first threshold and equal to or smaller than a second threshold than when the tone value of the dither matrix is equal to the first threshold.

12. The image forming apparatus according to claim 11, wherein
in the halftone processing, an exposed area of the second region is smaller than the exposed area of the first region when the tone value of the dither matrix is equal to or larger than the first threshold and smaller than the second threshold.

13. The image forming apparatus according to claim 11, wherein
in the halftone processing, when the tone value of the dither matrix is equal to or larger than the first threshold and equal to or smaller than the second threshold, the exposed area of the first region decreases as the tone value of the dither matrix increases.

14. The image forming apparatus according to claim 11, wherein
in the halftone processing, when the tone value of the dither matrix is equal to or larger than the first threshold and equal to or smaller than the second threshold, an exposed area of the second region increases as the tone value of the dither matrix increases.

15. The image forming apparatus according to claim 11, wherein
in the halftone processing, when the tone value of the dither matrix is equal to or smaller than the first threshold, the exposed area of the first region increases as the tone value of the dither matrix increases.

16. The image forming apparatus according to claim 11, wherein
in the halftone processing, when the tone value of the dither matrix is equal to or smaller than the first threshold, the exposed area of the first region is continuous, and the second region is unexposed to light.

17. The image forming apparatus according to claim 11, wherein
in the halftone processing, when the tone value of the dither matrix is equal to the second threshold, the pixels in the dither matrix have the same exposed area, and each of the pixels in the dither matrix is partially unexposed to light.

18. The image forming apparatus according to claim 11, wherein
the tone value of the dither matrix is a tone value of the pixels in the dither matrix when the pixels in the dither matrix have the same tone value.

19. The image forming apparatus according to claim 11, wherein
a maximum tone value of a pixel in the second image data is equal to or smaller than a maximum tone value of the pixel in the first image data, and decreases depending on an image height of the pixel on the photosensitive member as the scanning speed of the scanning unit decreases.

20. The image forming apparatus according to claim 11, wherein
the second threshold is smaller than the smallest value among maximum tone values in the second image data that correspond to different image heights.

21. An image forming apparatus, comprising:
a photosensitive member;
a halftone processing unit configured to determine exposed regions of pixels in an image to be formed by applying halftone processing to image data using a dither matrix;
a correction unit configured to correct the exposed regions of the pixels determined by the halftone processing unit in accordance with image heights of the pixels on the photosensitive member; and
a scanning unit configured to form a latent image by scanning the photosensitive member with light that changes in scanning speed in accordance with an image height based on post-correction exposed regions of the pixels corrected by the correction unit.

22. The image forming apparatus according to claim 21, wherein
the correction unit is further configured to make no correction to the exposed regions determined by the halftone processing unit with respect to pixels of image heights for which the scanning unit performs scanning at a scanning speed equal to or higher than a first threshold.

23. The image forming apparatus according to claim 22, wherein
the correction unit is further configured to perform correction of reducing the exposed regions determined by the halftone processing unit with respect to pixels of image heights for which the scanning unit performs scanning at a scanning speed lower than the first threshold.

24. The image forming apparatus according to claim 23, wherein
the correction unit is further configured to determine the post-correction exposed regions depending on a scanning speed with respect to pixels of image heights for which the scanning unit performs scanning at a scanning speed lower than the first threshold.

* * * * *